FIG. I

INVENTOR.
PETER C. BROCKETT
CHARLES L. DUVIVIER
BY
Edward H. Eames
ATTORNEY

INVENTOR.
PETER C. BROCKETT
CHARLES L. DU VIVIER
BY
Edward W. Cairns
ATTORNEY

INVENTORS
PETER C. BROCKETT
CHARLES L. DUVIVIER
BY
Edward H. Cairns
ATTORNEY

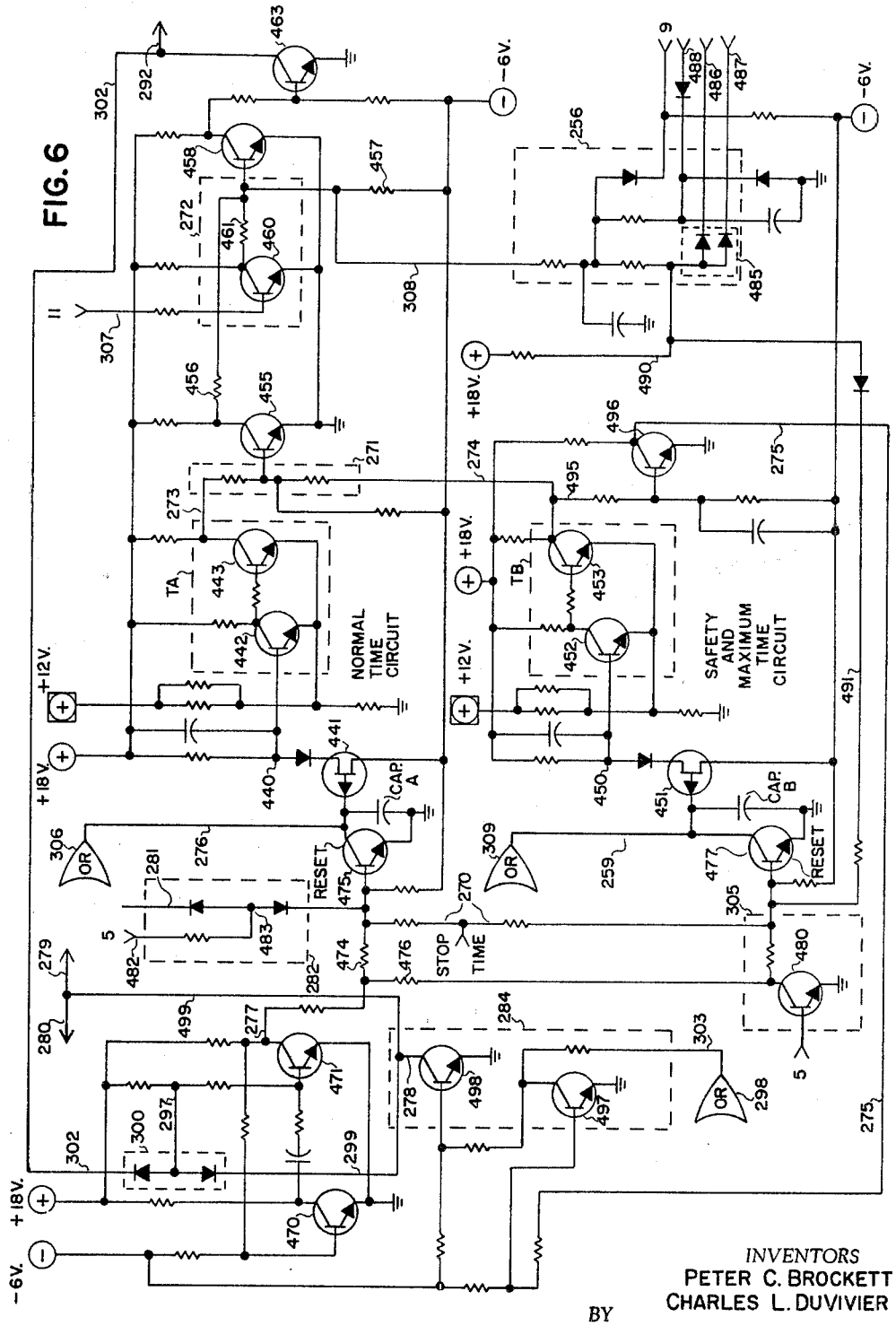

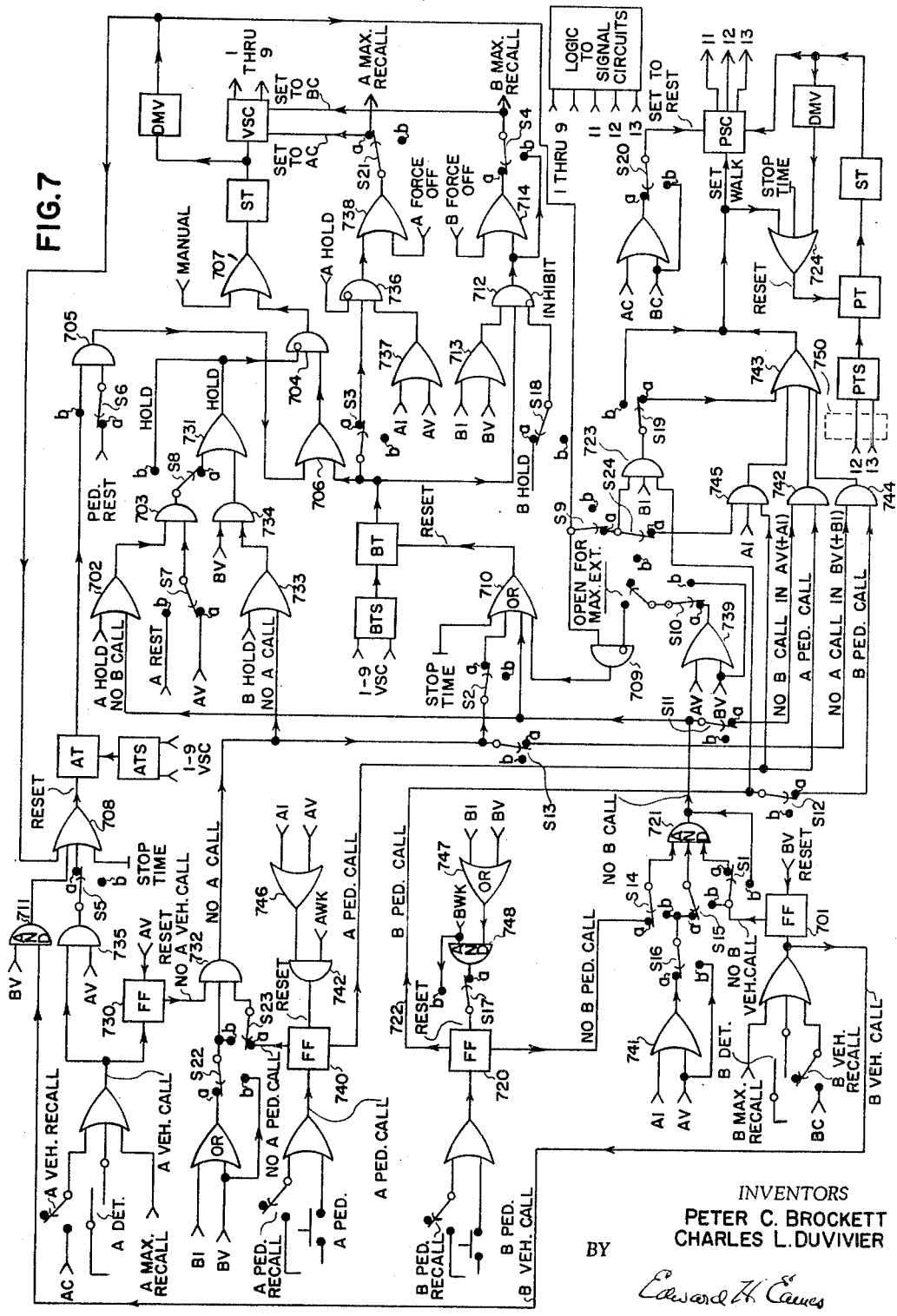

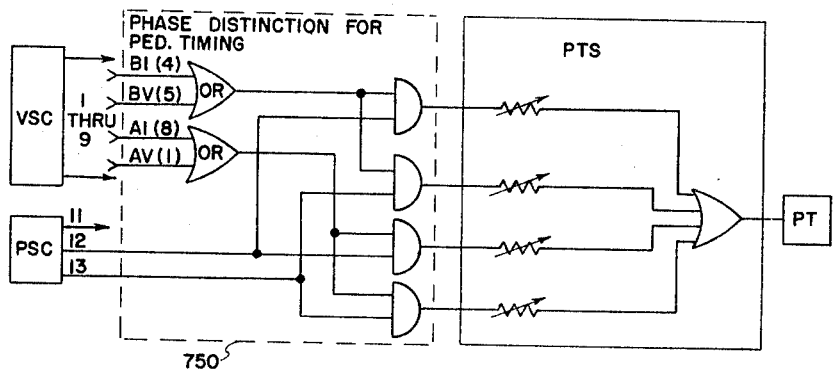

FIG. 8

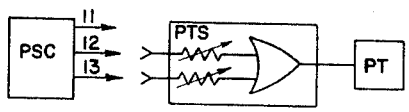

FIG. 8a

COMMON TIMING OF PED. INTERVALS FOR BOTH PHASES

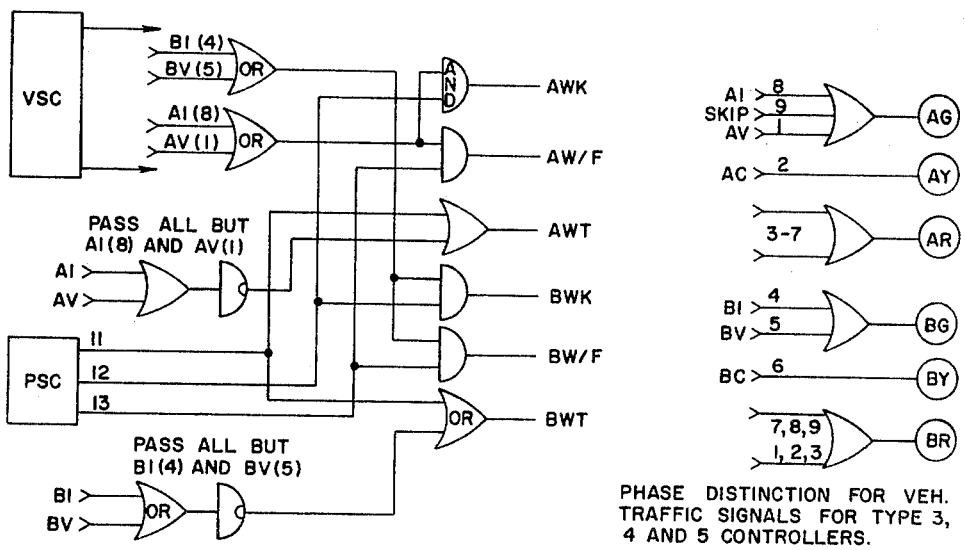

PHASE DISTINCTION FOR PED. TRAFFIC SIGNALS FOR TYPE 5 CONTROLLER

FOR PED. TRAFFIC SIGNALS FOR TYPE 4 ELIMINATE AWK, AW/F AND AWT
OR
BWK, BW/F AND BWT

FIG. 9

PHASE DISTINCTION FOR VEH. TRAFFIC SIGNALS FOR TYPE 3, 4 AND 5 CONTROLLERS.

SEE FIG. I OR 4 FOR VEH. AND PED. TRAFFIC SIGNALS FOR TYPE 2 (TWO VERSIONS)

FOR TYPE I TRAFFIC SIGNALS ELIMINATE PED. SIGNALS FROM FIG. I OR 4.

INVENTORS
PETER C. BROCKETT
BY CHARLES L. DUVIVIER

Edward H. Eames
ATTORNEY

United States Patent Office 3,267,424
Patented August 16, 1966

3,267,424
TRAFFIC ACTUATED CONTROL SYSTEM
Peter C. Brockett, Milford, and Charles L. Du Vivier, Darien, Conn., assignors to Laboratory for Electronics, Inc., Boston, Mass., a corporation of Delaware
Filed Jan. 2, 1964, Ser. No. 338,555
23 Claims. (Cl. 340—37)

The present invention relates to an improved traffic signal control system or traffic signal controller employing solid-state components and contemporary circuitry. More particularly, in its principal aspect, the invention relates to an improved traffic signal controller of the semiactuated type which is completely electronic, including the cyclic control mechanism, and is substantially free from mechanically moving parts. In a further aspect the invention relates to an improved traffic signal controller, generally.

This application is a continuation-in-part of a joint application, Serial Number 284,073, filed on May 29, 1963 under the name Traffic Actuated Control System.

Problems of prior art systems

In the field of traffic control it is desirable, in a traffic signal controller, to have a substantially definite and absolute cycle of operation, in which right-of-way (ROW) to one or another traffic flow is distributed in accordance with a definite prearranged cycle or traffic condition. Various methods of distributing such ROW between conflicting traffic flows have been used with varying degrees of success, but each having its limitation in one form or another. One form of allocating device having definite and absolute steps is a familiar telephone line switch or stepping switch. Another form is a solenoid operated cam shaft which is rotated in a series of steps through a complete cycle of operation, during which contacts are opened and closed by cam lobes positioned to affect contacts in various stages or steps of cyclic rotation of the cam shaft. Each of these allocating devices provide a step-by-step sequence of operation which is definite and absolute and provides such step-by-step sequence with a reasonable degree of certainty, guarding against energization of more than one step at any one time. The limitation of such stepping switch devices is that each is mechanical and has many mechanically movable parts which are greatly subject to failure due to the presence of foreign matter and dirt which interfere with contact connections and also subject to wear and destruction through wear which will limit the life and service of the controller.

Some temporary controllers propose the use of an electronic chain type or ring circuit arrangement which provides a cycle of successive interlinked steps, with advance-control between successive steps for stepping forward in the cycle and feedback-control for terminating the previous step. Such interlocking provides that advance to the next step of the cycle depends upon operating an electrical circuit, such as a memory circuit, for example, of such next step from a rest or non-operating condition to a nonrest or operating condition through a controlled timing or delay device of the current step and termination of the current step (returning the electrical circuit or memory to a rest or nonoperating condition and resetting the timing or delay device) is controlled by feedback from the operated electrical circuit or memory of the next step.

This arrangement has eliminated the mechanical moving parts and has overcome the relatively short life span of cyclic devices employing such components. The limitation associated with an electronic chain type circuit or ring circuit is that such circuits lack the high degree of definite and absolute stepping usually associated with mechanical step-by-step cyclic mechanisms and the certainty of assurance that only one step will be actively energized at one time. The uncertainty of definite singular step energization is derived from the operational characteristic of a chain type or ring circuit in that the occurrance of the advance to the next step is dependent upon a condition precedent in the prior step and release or termination of any one step is dependent upon actual advance into the next step. Further, extreme caution need be exercised to avoid sporadic and/or transient voltages from energizing a ring circuit element out of successive order, since energization of ring circuit elements is normally provided upon application of an initiating voltage pulse. If two non-adjacent ring circuit elements were concurrently energized at some time during the cyclic operation of the device it is not clear that such condition would be recognized by the cyclic device nor is a remedial step apparent from the devices proposed, which would eliminate this undesired condition.

Such chain type or ring circuit arrangement is also limited from the standpoint of preemption requirement, normally associated with a traffic signal controller, that is, to drive the cyclic controller to a predesired position from any other position and suspend operation of the cyclic controller in favor of operation of some other device. In addition, a ring type circuit does not lend itself simply to manual cycling because of the lack of a common input for cycling such device.

Advantages of improved traffic signal controller of present invention

The present invention provides an improved traffic signal controller in which a step-by-step cyclic operation is provided with the certainty and definiteness of a mechanical device, such as a line switch, coupled with the faculty of being free from mechanically moving parts. The electronic step-by-step cyclic control device used in the present improved signal controller is substantially more flexible than a mechanically operated line switch or other mechanical stepping device, in that the electronic form of such stepping switch presented herein may be preset so as to be driven to a desired condition or position without stepping through intervening steps and yet permit itself to be driven to an out-of-sequence position with the definiteness of a normal cyclic change, regardless of what position the controller is in relative to the position to which it is to be driven. Further, driving such electronic step-by-step control device from any one position to a predesired position is accomplished substantially instantaneously, if desired.

In addition, the electronic form step-by-step switching component is advanced through its cycle by providing a voltage pulse at a particular input terminal which is the same terminal regardless of what step or position the electronic switching component is then in. This feature lends itself to simple manual cycling. Further, unlike an electronic chain or ring type circuit, advance of the electronic step-by-step switching component presented herein is accomplished by a voltage pulse, which is independent of the electronic cyclic switch, while the advance to another step does not depend upon the cyclic switch being in the prior step and termination of the prior step does not depend upon energization of the succeeding adjacent step. Still further, the presented form electronic step-by-step switching component avoids the possibility of energization of two different steps at the same time during the cyclic operation of the electronic switching device.

Thus, the present improved signal controller includes the features of reliable step-by-step cyclic operation, as found in mechanically operated devices, the advantage of a controller without mechanically moving parts, such as found in the electronic chain type control device, and further including improved features of instantaneous preemption, as well as being capable of manual advance, when desired. In addition to the features described above, the present improved traffic signal controller employs the use of solid-state components and thereby provides a traffic signal control device having the economy and long life which normally is associated with such solid-state components, since such components are considered practically indestructible.

*Preliminary summary of several forms or aspects of the invention*

The present invention is disclosed in several forms which are shown in comprehensive block diagram form. Among the drawings are shown two forms of solid-state electronic step-by-step control devices, each in circuit and block diagram form. Each form of electronic step-by-step control device may be used interchangeably in any of the several forms of improved traffic signal controller, so long as the electronic step-by-step device provides the required number of steps or positions. One form of electronic step-by-step control device essentially includes a plurality of bistable flip-flops, connected in cascade circuit arrangement, functioning in binary fashion, providing a series of eight sequential output steps. An eight step sequence of outputs is provided when three flip-flops are cascaded and the outputs of each flip-flop are applied to eight sensing circuits of a diode matrix in which each matrix sensing circuit responds to a different one of a combination of three predetermined input conditions.

The binary form of electronic step-by-step control device and an associated diode matrix may provide a four step output when two flip-flops are connected in cascade circuit fashion.

The other form of electronic step-by-step control device that is illustrated partly in circuit and partly in block form, is a cascade connected two stage trinary circuit with a diode matrix. With one trinary stage, a three step output may be obtained while in a two stage trinary circuit arrangement a nine step output may be provided when two trinary circuits are cascade connected and are associated with a diode matrix, employed as trinary circuit condition interpreting circuitry from which the several steps of the cycle are derived.

*Objects of the invention*

It is an object of the invention to provide an improved traffic signal controller in which a multistage electronic counting circuit is advanced step-by-step through a cycle of steps to control the cycle of signal indications in response to pulses from an electronic timer which times the periods the counting circuit remains in different such steps.

It is another object of the invention to provide an improved traffic actuated traffic signal controller in which relays or power type solid-state devices for operating the signal circuits are controlled by all solid-state cyclic switching and timing circuitry in response in part to traffic actuated input pulses.

It is a further object of the invention to provide a traffic signal controller in which a multistage counting circuit having a series of solid-state switching elements is advanced step-by-step through a cycle of steps to control the cycle of signal indications in response to pulses from a solid-state timing element which times the periods the counting circuit remains in different such steps.

It is also an object of the invention to provide a traffic signal controller in which a solid-state timing device is coupled to time several individual steps of a multistep signal control cycle, by means of a multistage series of bistable solid-state electrical switching elements coupled as a cyclic switching circuit.

It is a further object of the invention to provide an improved solid-state traffic signal controller in which series coupled bistable solid-state electrical circuits serve as a centralized cycle control device for the signal cycle.

It is a further object of the invention to provide a traffic actuated traffic signal controlled in which the signal circuits are controlled in a multistep cycle by solid-state resistance-capacitor timing circuitry coupled to multistep cyclic sequence switching circuitry of solid-state switching elements and controlled in part by traffic actuation.

It is another object of the invention to provide a traffic actuated traffic signal controller, in which one or two solid-state timing elements are coupled to a multistage counting circuit of solid-state switching elements under control of the latter, to advance the latter step-by-step through a cycle of more than two steps under timing control by one or the other of the two timing elements and in which the advance of the counting circuit at one or more of the steps is controlled by at least one of the timing elements and traffic actuation.

It is also an object of the invention to provide a traffic signal controller in which the signal circuits are controlled in a multistep cycle by solid-state type resistance-capacitor timing circuitry coupled to multistep cyclic switching circuitry of solid-state switching elements, in which a single capacitance element, with a trigger circuit controlled thereby, is coupled to different resistance elements in different steps of the cycle by the multistep switching circuitry to control the advance of the latter in its cycle to enable different time periods to be provided in different steps of the cycle.

It is also an object of the invention to provide a traffic actuated traffic signal controller in which one multistage electrical sequence switching circuit of electronic switching elements serves for cyclic control of the main cycle of the signal, including a vehicle actuated part of such cycle, and a second multistage electrical sequence switching circuit of electronic switching elements controls a pedestrian actuated subcycle associated with the vehicle actuated part of the main cycle.

It is also an object of the invention to provide a traffic signal controller which is itself part of a family of solid-state traffic signal controllers in which one on another traffic signal controller of a family of solid-state traffic signal controllers may be provided by selectively including and/or excluding one or another circuit function of others of the family of solid-state controllers.

Further objects will appear from the following description and claims with reference to the accompanying drawings in which:

*Summary of drawings*

FIG. 6 is a diagram, partly in circuit and partly in block form, of the timing and reset circuitry of the controller represented in FIG. 4;

FIG. 7 is a comprehensive block diagram of another form of the present invention in which a plurality of switches which may be selectively positioned, may be arranged to include and/or exclude certain circuit functions to provide a family of solid-state traffic signal controllers;

FIG. 8 is a logic diagram illustrating one method of providing separately adjustable and individually timed pedestrian right-of-way intervals for each phase;

FIG. 8a illustrates one form of timing the pedestrian right-of-way intervals in which the timing of walk and caution intervals is individual to each interval but is common to both phases, and FIG. 9 represents, in logic form the outputs of the vehicle stepping switch, and the pedestrian stepping switch and the logic circuitry for providing power to the traffic signal circuits for the five different types of controllers represented in FIG. 7.

Figure 1:
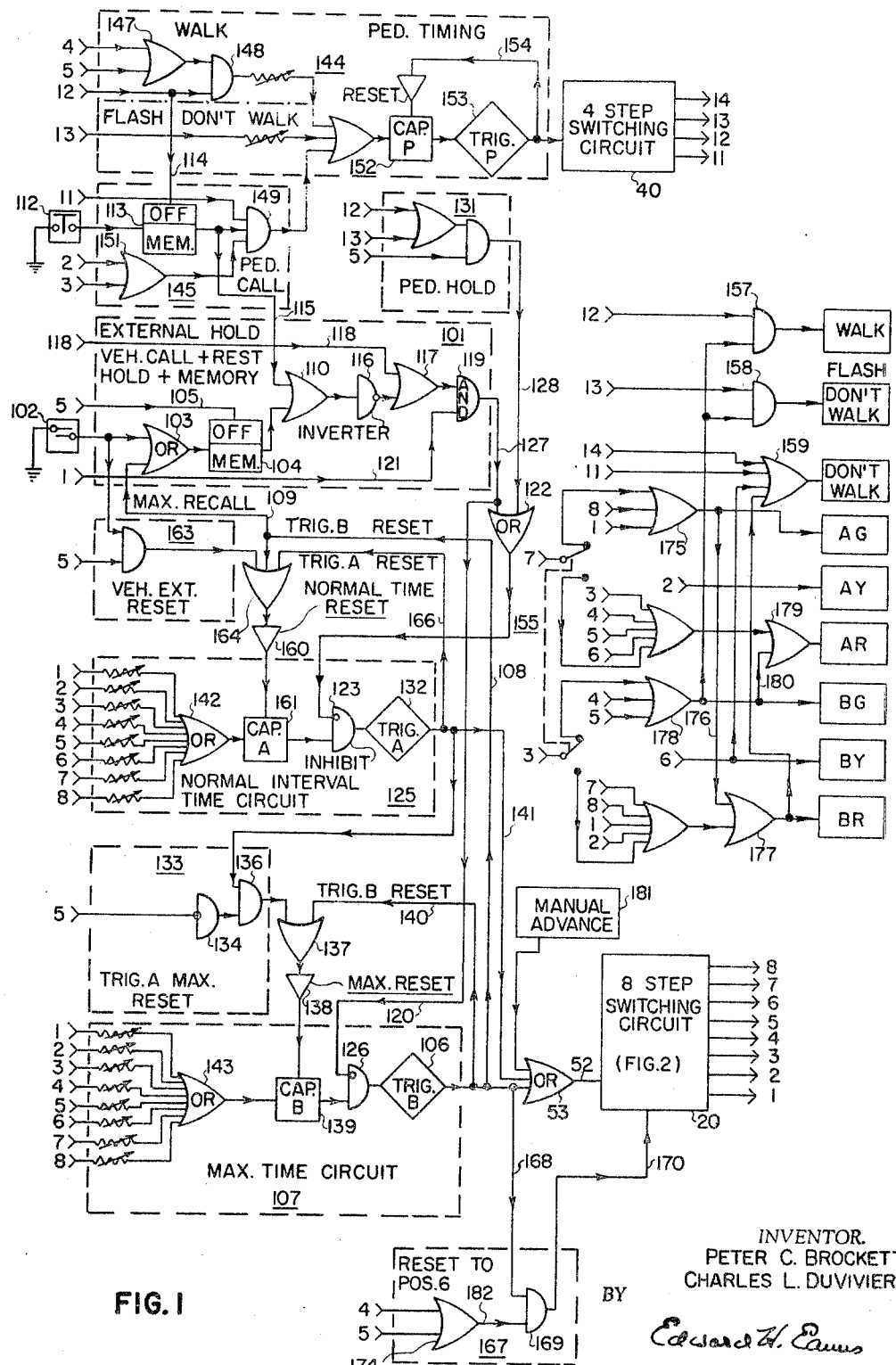
FIG. 1 is a block diagram of one form of the invention representing a semiactuated two-phase traffic signal control system with an actuated pedestrian phase which may be displayed substantially concurrently with the actuated cross street phase.

The semiactuated controller of FIG. 1

Referring to FIG. 1 in more detail, a comprehensive block diagram representing one form of two phase semiactuated traffic controller with an actuated pedestrian phase associated with the vehicle actuated phase, with associated vehicle detector, pedestrian push-button, signals and signal circuits is presented, with the various components and combined components represented functionally.

Where two or more components, combine functionally to effect one or another of the cyclic functions, of the controller, such blocks have been grouped by a broken line box in which a functional legend appears.

Although certain of the blocks in FIG. 1 are illustrated in preferred circuit form in subsequent figures, it should be understood that the various "gates" represented in FIG. 1 individually represent a variety of circuit configurations, any of which may provide the function common to the respective gates.

Figure 2:
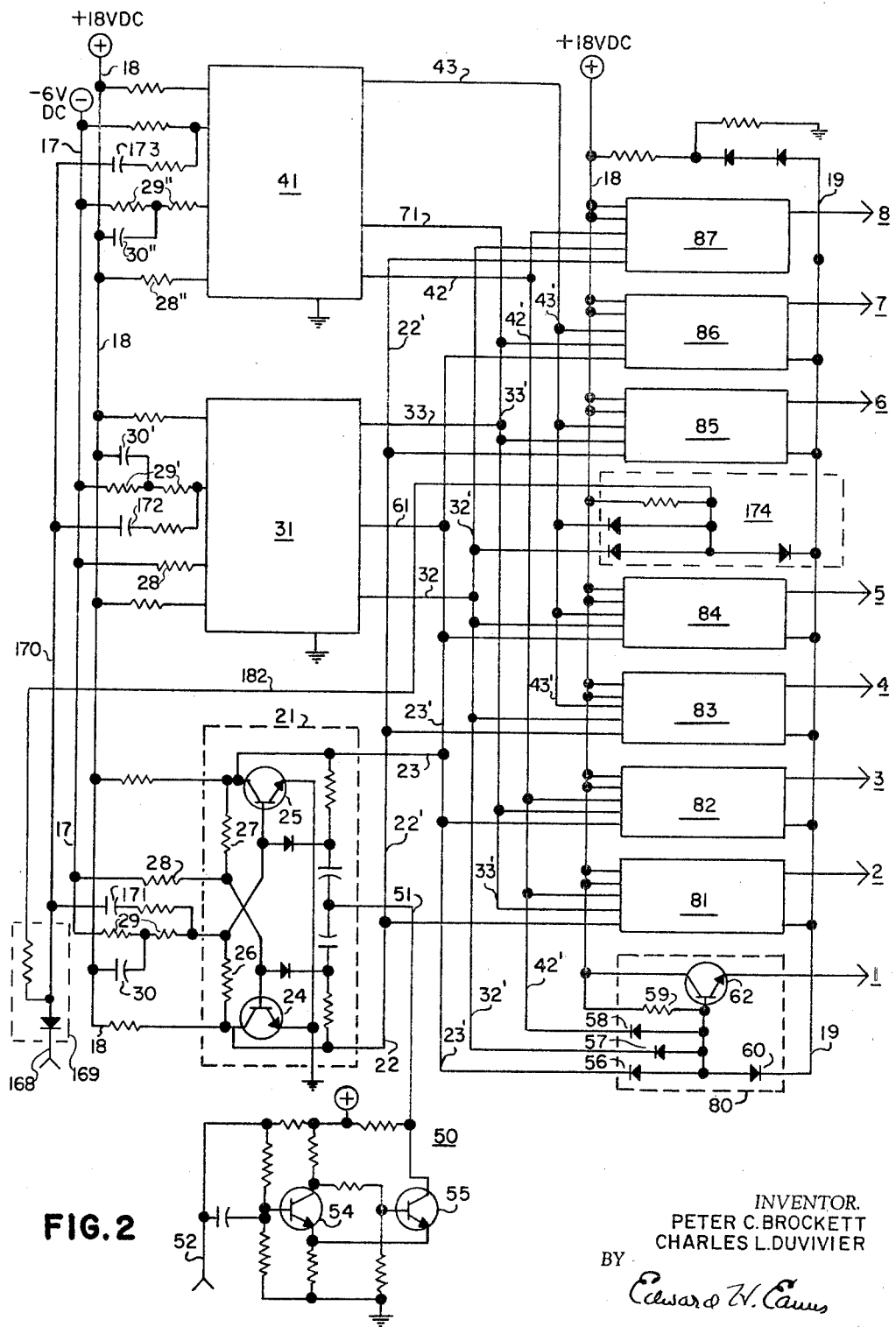
FIG. 2 is a diagram, partly in circuit and partly in block form of one form of electronic binary type step-by-step switching or control circuit in which three bistable flip-flops are cascade connected and operated in binary fashion to provide a combination of outputs which are separated by a diode matrix into discrete steps for providing a sequence of eight sequentially arranged outputs.

Eight step switching circuit of three binary stages—FIG. 2

One form of block 20, the 8 STEP SWITCHING CIRCUIT is illustrated partly in circuit and partly in b'ock form in FIG. 2 where a three stage bistable flip-flop or binary circuit, arranged in cascade connection, provides eight discrete output combinations and a diode matrix is provided for sensing such output combinations and for providing therefrom a series of eight sequentially arranged outputs for providing an eight step cycle for controlling the operation of the traffic control system represented in FIG. 1.

Block 20 functionally provides control over the cyclic operations of the controller and determines the cyclic condition of the controller.

As shown in FIG. 2, the binary form of 8 STEP SWITCHING CIRCUIT is provided with a source of positive power, 18 volts direct current (D.C.) for example, represented by a plus in a circle, for operating the transistors, a negative 6 volts D.C. supply, for example, represented by a minus in a circle, for providing solid-state component bias power, each measured with respect to a common ground, represented by the usual ground symbol.

The binary counting circuit of the switching circuit includes three flip-flops, in cascade connection of which, in FIG. 2 one flip-flop is illustrated in full circuit form. The other two flip-flops are partially illustrated and partially represented in block form. The boxes 31 and 41 represent circuitry identical to that illustrated in broken line box 21. The input networks of the respective flip-flops which may differ somewhat, one from the other are illustrated in full circuit form.

Each flip-flop has two outputs, which for convenience are referred to as 22 and 23, extending from the lower (fully illustrated) flip-flop, 32 and 33 extending from the middle (partially illustrated) flip-flop and 42 and 43 extending from the upper (partially illustrated) flip-flop.

With respect to the individual flip-flops, outputs 22, 32 and 42 are corresponding and outputs 23, 33 and 43 are corresponding. When corresponding outputs are in similar conditions the respective flip-flops are also in similar conditions.

Lead 51 represents the input lead from the trigger circuit 50, which is here considerd part of the 8 step switching circuit, which trigger circuit may be a Schmitt trigger or a Schmidt trigger, each of which provides a negative going pulse, which serves to reverse the conductive conditions of the normally oppositely conducting transistors 24 and 25 of the lowermost flip-flop 21.

Lead 52 shown in FIG. 1 and FIG. 2 represents the input lead which operates the trigger 50. In the form presented herein, without intending a limitation thereof, a negative going pulse, generated by either TRIG A or TRIG B (FIG. 1) at termination of a timed interval is applied to lead 52 via the "OR" gate (53 in FIG. 1). The negative going pulse from TRIG A or TRIG B is applied to the base of normally conducting transistor 54 which drives transistor 54 to cut-off. When transistor 54 goes to cut-off its collector terminal goes positive, thereby, driving normally nonconducting transistor 55 to conduction. Conduction of transistor 55 drives its collector terminal toward ground thereby applying a negative going pulse via lead 51 to the first flip-flop of the three cascade connected flip-flops. Trigger circuit 50 regains its normal (initial) condition when the negative going pulse from TRIG A or TRIG B is removed.

Each flip-flop is arranged so that one transistor, is conducting and the other transistor is nonconducting, which condition is a stable condition, capable of being reversed when a negative going pulse is applied to the input of the flip-flop. Assuming transistor 24 is conducting and transistor 25 is nonconducting, a negative going pulse applied to the input of the lowest flip-flop (for identification hereinafter referred to as 21) via lead 51 is applied to the base terminal of each transistor (24 and 25) of the flip-flop. Transistor 24 is driven to a nonconducting state. As transistor 24 becomes nonconductive, its collector terminal becomes more positive. The positively increased potential at the collector of transistor 24 is passed through resistance 26 and overcomes the negative bias (−6 volts, D.C.) applied to the base of transistor 25 and drives transistor 25 to a conductive state. As transistor 25 becomes conductive, the potential at its collector terminal decreases from some positive value to essentially ground potential. The essentially ground potential is applied through resistance 27 to the base of transistor 24 holding the transistor nonconductive.

The change in potential at the collector terminal of transistor 25 is applied to lead 23, 23' and thence to input lead 61 of the middle flip-flop (which lead corresponds to input lead 51 in the lower flip-flop).

Thus the middle flip-flop (hereinafter referred to as 31, for convenience) is pulse-fed via the action of transistor 25 of flip-flop 21, going from a nonconductive state to a conductive state. The outputs 32 and 33 of 31 correspond to the outputs 22 and 23 of 21.

When the corresponding transistor (25) of flip-flop 31 goes from a nonconductive state to a conductive state the potential on output lead 33 is reduced from some positive potential toward ground. This negative going potential is applied to lead 33' and to input lead 71 of upper flip-flop (with lead 71 corresponding to leads 61 and 51) thereby reversing the condition of the transistors (corresponding to 24 and 25) in the upper flip-flop (hereinafter referred to as 41, for convenience) each time a negative going pulse appears from output lead 33 to input lead 71. The leads 42 and 43 of 41 correspond to the leads 22 and 23 of 21.

Thus flip-flop 21 is reversed each time a negative pulse appears at input 51 from trigger 50, flip-flop 31 is reversed each time a negative pulse appears at input 61 from output 23 and flip-flop 41 is reversed each time a a negative pulse appears at input 71 from output 33.

Since the three flip-flops are identical, except for the input networks, which are separately shown, it will be understood that one of the other of the pair of transistors of each of the flip-flops will be conducting at substantially all times and thus one of the output leads 22 and 23 of the 21, 32 and 33 of 31 and 42 and 43 of 41 will be positive and the other will be essentially at ground. Thus eight combinations of three similar potentials are provided which may be sensed in a desired sequence by a diode matrix, as shown.

The diode matrix is divided into eight units, each of which sense a different one of the eight possible combinations of positive outputs by the output leads.

Each sensing unit or circuit of the diode matrix, such as the circuit illustrated in broken line box 80, is connected to a different combination of three of the six output leads 22, 23, 32, 33, 42 and 43. For convenience, the bus leads extending from the output leads are given primed numbers. For example, the sensing circuit of box 80 is connected to leads 23', 32' and 42', to lead 18, the common plus 18 volt D.C. supply, and to lead 19 the common plus 13 volt D.C. supply.

The blocks 81–87 are identical circuitwise to the circuitry illustrated in box 80 except that the three connections from each of the blocks connect to a different combination of three output leads of the flip-flops, so that a step-by-step arrangement of outputs via the leads 1–8 is provided as the cascaded flip-flops change their condition in binary fashion.

The sensing circuit, block 81 is connected to output leads 22', 33' and 42', block 82 is connected to output leads 23', 33', and 42', block 83 is connected to 22', 32' and 43', block 84 is connected to 23', 32' and 43', block 85 is connected to 22', 33' and 43', block 86 is connected to 23', 33' and 43' and block 87 is connected to the output leads 22', 32' and 42', and each of the blocks 81 through 87 are also connected to the 18 volt D.C. power via lead 18, and to a lower positive D.C. voltage, for example approximately +13 volts, on lead 19.

Referring to the circuitry in broken line block 80, when the potentials on leads 23', 32', and 42' are all positive, (identical) the +18 supply applied through resistor 59 is essentially blocked at diodes 56, 57 and 58 but since the positive supply on line 19 is essentially +13 volts some +13 volts are applied to the base of transistor 62. This drives the transistor to a conductive state from a normally nonconductive state. Thus output power is applied to the lead 1, thereby energizing output lead 1, all other output leads remaining deenergized. The diode matrix is arranged so that successive pulses from the trigger circuit 50 will sequentially step output power from one output lead to the next output lead as consecutively numbered so that a prearranged sequence of sequentially energized outputs is provided.

It should be understood that the block 20 in the block diagram in FIG. 1 represents an electronic multiposition step-by-step switching circuit, of which the preferred form is illustrated in circuit diagram form in FIG. 2, for providing an eight (8) step or position control sequence. Other forms of electronic multiposition switching circuits, such as an electronic trinary step-by-step switching circuit or a loop shift register circuit or a ring counter circuit may be used in lieu of the preferred form.

*Alternate two stage ternary step-by-step switching circuit—FIG. 6*

An electronic trinary or ternary type step-by-step switching circuit such as illustrated in circuit form in FIG. 6, for example, may be employed in lieu of the binary type step-by-step switching circuit but one of the nine (9) discrete steps of the trinary type arrangement would need to be essentially eliminated or be made a skip-step, for example, so as to reduce the number of steps to eight discrete steps. It will also be obvious that other multistage electronic step-by-step sequence switching circuits may be used in lieu of those herein described, in which the individual stages of a multistage electrical sequence switching circuit may be of dissimilar combinations of numerical count so as to provide the number of positions or steps in the counter, as desired. The number of steps or positions in a loop shift register circuit or ring counter circuit would, of course, depend upon the number of sections in the circuit arrangement.

The input network of each of the flip-flops is arranged so that when power is either initially turned on, or returned after having been removed because of a power failure or otherwise, for at least a substantial time, each flip-flop will be driven to a predetermined condition if they are not already in such condition. This is accomplished by applying positive power, which increases from substantially zero to some positive value as power is turned-on, through coupling capacitor 30 (30' and 30") and part of the resistance of resistor 29 (29' and 29") to the base terminal of one of the transistors (for example 25 in 21) so that a desired one transistor in each flip-flop will conduct. At the same time negative power is applied through resistor 28 (28' and 28") to the base terminal of the outer transistor (for example 24 in 21).

The input network of flip-flop 41 is identical to that of flip-flop 21 so that corresponding transistors (25) in each flip-flop will be driven to a state of conduction. The input network of flip-flop 31 differs from that of the others (21 and 41) and the lower transistor (corresponding to transistor 24) of flip-flop 31 is driven to conduction. This condition places output leads 43, 32 and 23 at substantially the same ground potential and leads 22, 33 and 42 at essentially the same positive potential. With leads 22', 33' and 42' at positive potential, the sensing circuit 81 provides an output by energizing output lead 2, thereby positioning the controller in position or step 2, for example, of the cycle of operation.

*Binary or ternary switching circuits for block 40*

Returning to the block diagram of FIG. 1, it will be noticed that a 4 Step Switching Circuit block 40 provides an output of 4 steps, or positions 11 through 14. The block 40 may be a binary type switching circuit in which two flip-flops, each of which may be similar to a single flip-flop of the binary type switching circuit of FIG. 2, may be cascaded and four sensing circuits, or a four output diode matrix, are provided to provide a four position step-by-step output, according to the condition of the pair of cascaded flip-flops.

It will be appreciated that a trinary counting or switching circuit may be conveniently substituted for the binary type switching circuit since, as described below, three output positions or steps of block 40 are used as cyclic outputs while the fourth output position or step is absorbed as a skip-step.

If a trinary type switching circuit were used to provide the three employed steps of the output of block 40 the diode matrix comprising the four sensing circuits would be eliminated.

It should be understood that the leads 1 through 8 extending from the block 20 and the leads 11 through 14 extending from block 40 are output leads which connect to one or more of the correspondingly numbered input leads. Connection of correspondingly numbered leads through the several figures is assumed.

Further it should be understood, as described with reference to FIG. 2, when power is applied to one of the leads 1 through 8 thereby energizing such lead, this corresponds to the current step of the cycle of the controller.

*General description of controller of FIG. 1*

The block diagram of FIG. 1 can conveniently be partitioned into the vehicle section and the pedestrian section. The vehicle section includes all the blocks below and including block 101, VEH (vehicle) CALL+REST HOLD+MEMORY and the signals including the circuitry for illuminating the AG (main street green), AY (main street yellow), AR (main street red), BG (cross street green), BY (cross street yellow) and BR (cross street red). It may be seen that the vehicle section is independent of the pedestrian section although as will be more fully described, the pedestrian section may exert some degree of control over the vehicle section, such control being exerted up to a maximum limit, as determined by the vehicle section.

Both the pedestrian ROW signals or phase (providing a green WALK for right-of-way for pedestrian traffic, for example, and the flash DON'T WALK, the clearance for pedestrian traffic, for example) and the vehicle cross street ROW signals or phase are actuated, or only provided upon actuation of "call" or recall. Operation of the controller is arranged so that the cross street vehicle phase may be displayed without the pedestrian phase, but in order that the pedestrian phase be displayed the cross street vehicle phase must be displayed. Thus it will be seen that a call for the pedestrian phase will also provide a call for the cross street vehicle phase. Closure of the contacts in box 102, serves as one method of providing a vehicle call for the cross street phase. Such vehicle call follows from box 102 to the OR gate 103 to the MEMORY (MEM) 104, except during position 5, as indicated by lead 105. The memory 104 accepts and remembers such call.

Figure 3:
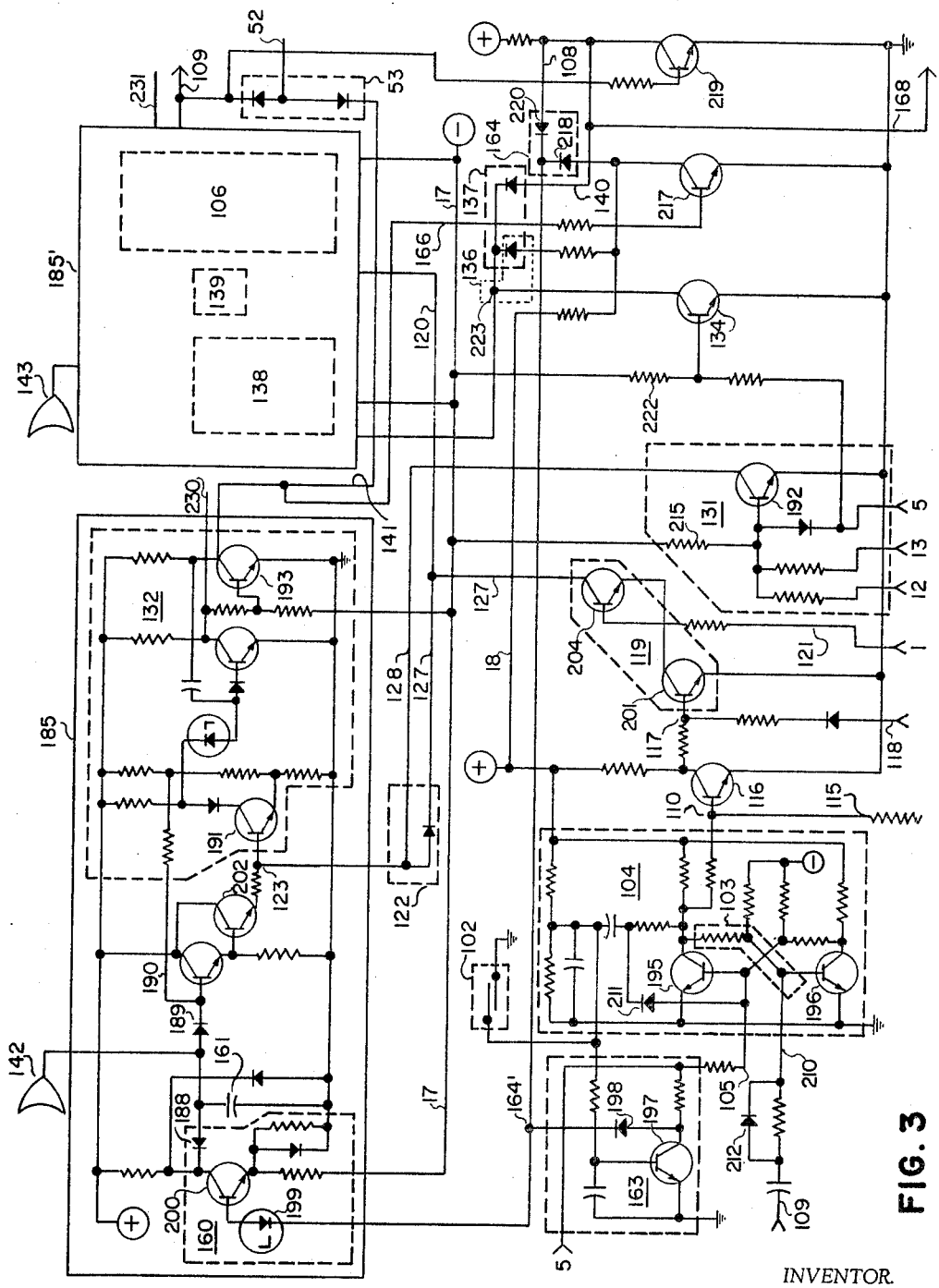
FIG. 3 is a diagram, partly in circuit and partly in block form, of one form of electronic timing circuit, reset, call and hold circuits particularly described relative to FIG. 1 but which could be used in FIG. 4.

One form of memory, such may serve as MEMORY 104, is illustrated in FIG. 3 as a solid-state, bistable flip-flop, the transistors of which, as more fully described below, are normally in opposite conditions of conduction. One of the transistors is conducting and the other is non-conducting when no call or recall is being remembered, with the conductive conditions of the transistors reversed by acceptance of a call when such call is received and remembered. Thus the difference between a call condition of 104 and no call condition 104, is the difference in the conductive conditions of the pair of transistors, resulting in a different potential of the output of memory 104, relative to the common ground.

Memory of the call is applied to OR gate 110. Termination of the cross street vehicle extendible interval by the MAX TIME CIRCUIT, timed in position 5, also serves to provide a vehicle call for return of the cross street vehicle phase. Call for return of ROW to cross street vehicle traffic by the MAX TIME CIRCUIT is referred to as MAX RECALL.

The MAX RECALL is provided upon operation of TRIG B, 106, which may be a Schmitt trigger, for example, when the MAX TIME CIRCUIT, 107 completes a time period thereby terminating the extendible vehicle interval, before the NORMAL INTERVAL TIME CIRCUIT completes its resettable time period. Max recall is initiated when TRIG B is operated, thereby providing a negative going pulse from TRIG B through 108, 109 to OR gate 103 to memory 104, and thence to OR gate 110. In the event that there are no vehicle calls and no max recall to cycle the controller to provide cross street or side street ROW, a pedestrian call or actuation may serve to provide a vehicle call. A pedestrian call may occur when the push-button 112 is closed and the call follows to a MEMORY circuit 113, except when switching circuit 40 is in its position 12, as indicated by 114. When switching circuit 40 is in its position 12, the pedestrian phase is being displayed and a pedestrian actuation or call has no effect on memory 113. When switching circuit 40 is in a position other than 12, the memory 113 accepts and remembers the pedestrian call and passes such call to AND gate 149, and also to OR gate 110 via 115, the latter serving as a vehicle call.

The call signal at OR gate 110 is inverted by the INVERTER 116 in such manner so that when a call signal is applied to inverter 116, the element serving as the inverter, becomes conductive and its output terminal is substantially at ground. When there is no call signal applied to 116 the inverter is held at cut-off and its output terminal provides a positive output to 117. Such positive output signal by inverter 116 therefore becomes a "hold" signal, when there is no call, which hold signal is removed by application of a call. The hold signal from 116 is applied to OR gate 117. The positive hold signal from the inverter 116 matches the hold signal obtained via operation of the EXTERNAL HOLD 118 (to hold via the external hold circuit a positive signal is applied to 117 via 118) which may serve as an external coordination input, which will defer the start of a cycle of operation until a predetermined time or occurrence, thereby keeping the controller in coordination with other controllers that may be part of a common, coordinated system. Thus, if there is a hold via 118 or there is no call for the cross street phase, a hold signal (positive with respect to ground) is applied to OR gate 117 and such signal is passed to AND gate 119. AND gate 119 will pass a hold signal from 117 when switching circuit 20 is in position 1, as indicated by 121. The output of AND gate 119 is a signal which is applied via 127 and OR gate 122 to INHIBIT gate 123 in the NORMAL INTERVAL TIME CIRCUIT 125, and via 127 and 120 to Inhibit gate 126 in the MAX TIME CIRCUIT 107 which defers termination of a time interval, or holds the respective timing circuits from terminating their respective time interval.

Thus, both the normal interval time circuit and the max time circuit are prevented from terminating their respective timed intervals, or are held when there is no call or recall and the switching circuit 20 is position 1, or there is an external hold and the switching circuit 20 is in position 1. When there is a call signal applied to inverter 116, the hold signal at 117 is removed, and in absence of a hold signal via the external hold, there is no hold signal applied through 117 to AND gate 119 so that a hold signal from 121 only, will be blocked by AND gate 119.

Attention is directed to OR gate 122 which is also fed from the PED (pedestrian) HOLD, block 131. Block 131 feeds into OR gate 122 when the 4 step switching circuit 40 is in its position 12 or 13, and the 8 step switching circuit is in its position 5. It will be noticed that the PED HOLD only effects the Normal Interval Time circuit and operates to hold or defer (inhibit) termination of a timed interval by such timing circuit, but the PED HOLD via OR gate 122 is not applied to the Max Time Circuit, so that although the normal timing circuit 125 may be deferred from terminating its timed period, the MAX TIMING CIRCUIT 107 may operate and terminate the interval being timed by operation of its TRIG B at the end of its timed period.

Block 125 and block 107 each represent timing circuits, which are substantially similar, except for the difference in the values of timing resistors in the timing capacitor charging circuit.

In one of its preferred forms, the traffic signal controller of the present invention is comprised of several printed circuit boards which together includes all the circuit functions necessary for operation of the controller. Each printed circuit board is inserted into or otherwise connected to a multiconnection plug or other contact arrangement which electrically connects the various circuits and circuit functions so that one or more related circuit functions may be placed or printed on one or more printed circuit boards, as desired. In this form it is desirable to have corresponding portions of both timing circuits substantially identical and individually placed on its own printed circuit board so that the particular portion of the timing circuits, and thus the printed circuit boards, are interchangeable and universally replaceable among controllers of the same family. The printed circuit boards on which the portion timing circuit is located may, if desired, exclude the timing resistor, and such resistors could be at or on another location or board. Thus the timing circuits for the Normal Interval Time Circuit and the Max Time Circuit may be interchanged without changing the timing resistors and vice versa.

Further, it will be realized that the difference between the Max Time Circuit and the Normal Interval Time Circuit is essentially the value of the timing resistors of the charging circuits.

Although one form of transistor timing circuit is illustrated in FIG. 3 it should be understood that other circuit forms may be employed to serve the same timing functions, such as transistor timing circuits employing field effect transistors for example, or a ring timer circuit which may provide the delay required.

*Operation of controller of FIG. 1 through its cycle*

As the switching circuit progresses through its successive steps 1 through 8, power is selectively applied through each successive output (1 through 8), and is applied to the corresponding input into each of the timing circuits. In the positions or steps 1, 2, 3, 6, 7 and 8 the Max Time Circuit serves essentially as a safety circuit which operates to terminate the interval timed in the event of a failure of the Normal Interval Time Circuit.

During positions 4 and 5 the Max Time Circuit times the maximum limit that the controller will be permitted to remain in the combined positions 4 and 5. This is accomplished by permitting reset of the Max Time Circuit by operation of the TRIG A 132 of the Normal Interval Time Circuit in all positions except position 5. This reset circuit is represented by block 133 TRIG A MAX RESET. The inhibit gate 134 provides an output signal to AND gate 136 for all positions except 5. Thus in all positions except position 5, reset of the Max Time Circuit may be accomplished by operation of TRIG A, via completion of a time period by the Normal Interval Time Circuit which will provide a signal to the AND gate 136, which passes such signal to the OR gate 137 to the MAX RESET 138 which will reset the timing capacitor CAP B in box 139.

Operation of the TRIG B also operates to reset the Max Time Circuit via 140 to OR gate 137 and thence to reset 138. Operation of TRIG B 106 causes reset of the Max Time Circuit without regard to the position of the controller.

A preferred form of the timing circuits and reset circuits shall be described below. Generally, the timing circuits 107 and 125 may be substantially similar to each other, each including eight parallel inputs (each input including a timing resistance) except that the individual resistances may differ in value. A common timing capacitor is used with each set of eight parallel resistances with the set of resistances in series connection with a common OR gate, 142 in 125 and 143 in 107. For each position of the switching circuit a separate resistance charging circuit for the respective timing capacitor is provided, as indicated by the inputs 1 through 8 extending from the left side of each block 107 and 125 with each circuit isolated from each other by isolating diodes, for example.

When the switching circuit moves electronically from one position to another position, for example, from position 1 to position 2, power is removed from the output 1 (output 1 is deenergized) of the matrix (FIG. 2) and is applied to output 2 (output 2 is energized). When position 2 is energized, power is applied to all inputs labeled number 2 including those of the timing circuits. In a preferred form, the power applied to charge the capacitor of the respective time circuit is controlled by the adjustable timing resistance in series between the input terminal to which power is applied and the common OR gate connected between the resistances and the timing capacitor. The timing capacitor (CAP A in 125 and CAP B in 107) is charged to a predetermined level over a time period determined by the R–C constant, at which time the charge on the timing capacitor may operate the trigger associated with the capacitor, so long as the respective associated inhibit gates 123 and 126 do not cause deferment of termination of the interval timed.

Both TRIG A 132 and TRIG B 106 in the illustrated form provide a negative going pulse to the OR gate 53 which passes the negative going pulse through lead 52 to the Schmitt trigger circuit 50, in block 20, 8 Step Switching Circuit, shown in circuit form in FIG. 2.

Either TRIG A or TRIG B may provide the negative going pulse to electronically advance the switching circuit to its next position. Since, as shown in FIG. 2, the switching circuit has no mechanically movable parts, it is here assumed that the switching circuits move or advance electronically.

Output power from the switching circuit is also applied to the inputs of the signal circuits. Corresponding numbers of the outputs of the switching circuit and the inputs of the signal circuits are electrically connected so that the switching circuit 20, directly controls certain of the signal indication. An alternate form of signal circuits may provide power type solid-state switching devices controlled by the outputs of the switching circuit for controlling the illuminating circuits or, signal relays which are controlled by the output of the switching circuit, with the contacts of the relays opening and/or closing illuminating circuits for the signal indications.

The pedestrian (PED) section of the controller is included in the combination of the 4 STEP SWITCHING CIRCUIT 40, the PED (pedestrian) TIMING 144, PED (pedestrian) CALL 145, PED (pedestrian) HOLD 131, certain of the signal circuits and the indicators WALK, flash DON'T WALK and steady DON'T WALK (or WAIT). Obviously the pedestrian signals may be in other forms than represented herein, if desired.

The PED TIMING 144 may be circuitry electrically similar to the Normal Interval Time Circuit or the Max Time Circuit. The pedestrian walk interval may be timed when the switching circuit 20 is in position 4 or 5, and the switching circuit 40 is in position 12. This is indicated by the inputs 4 and 5 extending to the OR gate 147, and the output of the OR gate 147, and the input 12 (from the switching circuit 40) both extending to AND gate 148.

As indicated by 114, power applied to input 12 turns off memory 113 in 145, (returns it to a no-call condition) and prevents memory 113 from remembering a call received while switching circuit 40 is in position 12.

The flash DON'T WALK indication is timed when switching circuit 40 is in its position 13. The PED CALL circuit will pass a pedestrian call from the memory 113 through AND gate 149 when switching circuit 40 is in its position 11 and switching circuit 20 is in its position 2 or 3. This is indicated by the combination of OR gate 151 feeding into AND gate 149 along with the input 11 and the output of memory 113.

The block 152, CAP P, represents a timing capacitor which when charged to a predetermined level operates TRIG P 153 to provide a negative going pulse output to 4 STEP SWITCHING CIRCUIT 40 which causes circuit 40 which causes circuit 40 to advance electronically to its next position or condition. Reset of the timing capacitor 152 is by operation of 153 via 154.

It will be seen that operation of the 4 STEP SWITCHING CIRCUIT 40 by the timing circuit 144, of the pedestrian section, is independent of the vehicle section.

Illumination of the WALK signal may be accomplished only when switching circuit 40 is in position 12 and switching circuit 20 is in position 4 or 5 (or position 3 if switch 155 is in its illustrated position) as indicated by AND gate 157 in the signal illuminating circuit for the WALK signal.

When switching circuit 20 is in its position 4 or 5 (or position 3 with switch 155 in its illustrated position) the cross street green signal for vehicle traffic is illuminated and the main street red signal for vehicle traffic is illuminated. Thus, because of AND gate 157 the predestrian WALK signal may be illuminated only when the cross street vehicle green signal is illuminated and if the switching circuit 40 is in its position 12. Conditioning illumination of the WALK signal upon illumination of the cross street vehicle green signal provides additional safety for the pedestrian and is a preferred form of the signal circuitry interconnecting network.

The flash DON'T WALK, which is one form of pedestrian clearance, is illuminated when the switching circuit 40 is in its position 13 in conjunction with illumination of the green signal for cross street vehicle traffic.

Illumination of the flash DON'T WALK signal is conditioned upon illumination of the cross street vehicle green signal as illustrated by the inputs to the AND gate 158.

Under all other vehicle signal conditions, as indicated by OR gate 159, the pedestrian DON'T WALK signal is illuminated.

The PED HOLD circuit 131 may prevent operation of TRIG A 132 if switching circuit 20 is in its position 5 and switching circuit 40 is in its position 12 or 13. The PED HOLD circuit prevents or defers operation of TRIG A and thus prevents termination of the interval timed in position 5 by the normal interval time circuit so long as switching circuit 40 is in its position 12 or 13. Such PED HOLD circuit does not prevent the progressive charging of the timing capacitor 161 by its charging circuit, but prevents or defers operation of the trigger TRIG A 132 even though the triming capacitor 161 should attain a charge normally sufficient to cause operation of the trigger 132.

With reference to a vehicle call when the switching circuit 20 is electronically in position 5, the block VEH EXT RESET (vehicle extension reset) 163 provides for resetting the timing capacitor 161 i.e. resetting the accumulated charge on the capacitor to its initial value if such accumulated charge is below the threshold value at 189, so that a new time interval may be timed, via OR gate 164, during the extendible vehicle interval upon actuation of the vehicle detector by vehicle traffic. This is the extendible green period during which vehicle traffice actuating the vehicle detector on the cross street, may extend the green (ROW) time, up to a maximum limit, the maximum limit being timed by the max time circuit.

It should be noted that reset of the timing capacitor 161 is also accomplished by operation of the TRIG B, via 108 or by operation of the TRIG A, via 166 upon termination of a timed interval, however it should be noted that these latter resets occur only at the beginning of an interval.

It may occur that the PED HOLD may prevent operation of the trigger 132 by the normal interval time circuit in position 5, or that due to a failure, the normal interval time circuit fails to function properly and electronic advance of the switching circuit 20 out of position 4 or 5 fails to occur. In such event, the block 167, RESET TO POS 6, is provided, whereby if the switching circuit 20 is in position 4 or 5 and the Max Time Circuit operates its trigger 106 to terminate the interval, a pulse via 168 is applied to AND gate 169. The positive input from position 4 and/or position 5 is applied through OR gate 174, line 182 to AND gate 169. When both inputs (182 and 168) are applied to AND gate 169, the gate 169 passes a positive pulse to lead 170, into switching circuit 20 (see FIG. 2). The positive pulse passes through capacitors 171, 172 and 173 of the respective flip-flops. Such pulse will drive the flip-flops into a desired condition, so that the output leads 22, 32 and 43 will become positive, thereby making leads 22', 32' and 43' positive. With this combination selector circuit 85 of the diode matrix will energize its output lead 6, which positions the controller in the cross street clearance interval.

Referencing the positions of the 8 step switching circuit to the signal conditions of the controller, with switch 155 as illustrated, in position 7, 8 and 1 the main street or artery vehicle green signal, AG, is illuminated through OR gate 175. This illuminating circuit also may hold the cross street vehicle red signal BR also illuminated via 176 and OR gate 177. The main street vehicle clearance signal AY is illuminated in position 2. The signal BR, cross street vehicle red signal, overlaps the AG and AY signals and is illuminated during positions 7, 8, 1 and 2.

The cross street vehicle green signal, BG is illuminated in positions 3, 4 and 5 with the main street vehicle red signal AR, also held illuminated via OR gate 178 and OR gate 179 connected via 180. The cross street vehicle clearance signal BY is illuminated in position 6. The main street vehicle red, AR, overlaps the BG and BY signals, being illuminated in positions 3, 4, 5 and 6.

With the switch 155 arranged in its lower position AG, in position 7 and BG in position 3 are not illuminated, and in their place the AR and BR signals are respectively illuminated. These signals combine with the normally illuminated signals of the cross street and main street respectively to provide "all red" vehicle signals during positions 3 and 7.

MANUAL ADVANCE block 181 represents a means of manually cycling the switching circuit 20.

In the cycle of operation, position 1 is a hold-rest or skip position. If there is no call or recall and the switching circuit is in position 1, the controller will rest with ROW on the main street or artery, signals AG and BR illuminated. If a side street or cross street vehicle or vehicles actuate the detector so as to provide a vehicle call or there is a pedestrian call, and the controller is not held by the external hold, then the timing capacitor, when sufficiently charged may operate TRIG A to electronically advance the 8 step switching circuit to position 2. In position 2 the artery clearance intervals is timed by the Normal Interval Time Circuit, the Max Time Circuit times an interval as a safety circuit. At the end of the timed interval TRIG A is operated which provides a pulse to operate the Schmitt trigger circuit 50 (FIG. 2) which causes the switching circuit 20 to advance electronically to position 3.

In position 3, with switch 155 as illustrated, ROW is accorded to the side street vehicle traffic by illumination of signal BG and is simultaneously withdrawn from the main street traffic by illumination of signal AR.

If there was a pedestrian call in memory 113 when the controller moved into position 2 or if a pedestrian call should occur during position 2 or 3, such PED CALL signal will be passed by AND gate 149. Such signal will rapidly charge the timing capacitor 152 to a sufficient value to operate TRIG P 153. Operation of TRIG P will cause the trigger circuit in the 4 step switching circuit 40 to operate and electronically advance the switching circuit to its next position, here assumed position 12.

With switching circuit 40 in position 12 and the vehicle signal BG illuminated, the pedestrian signal WALK is illuminated. Although the walk indication according pedestrian ROW may be provided to pedestrian traffic, the timing of such ROW period is deferred until the 8 STEP SWITCHING CIRCUIT 20 is electronically advanced into its position 4.

If switch 155 is in its lower position, the position 3 becomes an "all red" interval in which signals AR and BR are illuminated. This is normally referred to as a double clearance interval. If the double clearance interval is provided the walk indication to pedestrian traffic is deferred and ROW is withheld from the pedestrian traffic during such period.

It should be noted, and will be more fully described with reference to FIG. 3, that reset of the timing capacitor of each timing circuit occurs at the beginning of the interval, that is, when the switching circuit has advanced into the new or next position, except that the Max Time Circuit timing capacitor 139 is not reset at the beginning of position 5 (see block 133 including inhibit gate 134).

When the interval timed in position 3 terminates, the switching circuit 20 is advanced into position 4, the initial interval of the cross street green or ROW period. The initial interval is timed by the Normal Interval Time Circuit. Concurrently, and independent of the timing of the initial interval, the WALK or pedestrian ROW begins to time. While the pedestrian ROW is being timed, additional PED calls are blocked at memory 113 as indicated by 114 from input 12 in 144.

At termination of the initial interval of the cross street green period, the switching circuit is advanced into position 5, the extendible vehicle interval of the cross street green period. If the time of the pedestrian ROW period has been adjusted so as to exceed the time of the initial interval, the pedestrian ROW period will continue to time, as indicated by the inputs 4 and 5 from switching circuit 20, into OR gate 147 with the output of 147 applied to AND gate 148 along with input 12 from switching circuit 40.

In position 5 the timing capacitor 161 may be reset to substantially its initial value at any time prior to termination of the interval by vehicle actuation of the detector on the cross street. This is provided for by VEH EXT RESET, block 163. It should be noted that the max timing capacitor 139 was not reset at the beginning of the interval timed in position 5, but the timing was extended over the positions 4 and 5.

Since the timing of the pedestrian intervals is independent of the timing of the vehicle intervals, termination of the pedestrian walk interval may occur without effect on the vehicle intervals. If, however, the switching circuit 40 is in its position 12 (WALK) or 13 (flashing DON'T WALK) the PED HOLD circuit 131 prevents termination of the interval timed in position 5 (the extendible vehicle interval), by the Normal Interval Time Circuit 125. However, such interval may be terminated by the Max Time Circuit 107 even though the Normal Interval Time Circuit is prevented from terminating such interval.

If the extendible vehicle interval is terminated by operation of the Max Time Circuit, Max Recall is provided to return ROW to the side street after ROW has been accorded to main street traffic for at least a minimum time.

Upon termination of the extendible vehicle interval, the switching circuit 20 is advanced to its position 6, the side street clearance interval.

If the pedestrian walk, position 12 had not terminated to advance the switching circuit 40 to position 13, timing of the walk interval will cease when the switching circuit 20 advances into position 6 (see block 144), the WALK indication will be extinguished and the DON'T WALK indication will be illuminated. This may indicate that the time period of the WALK interval is maladjusted and is set excessively high, or there is a failure in the ped. timing circuitry.

If, however, the switching circuit 40 was advanced from its position 12 to its position 13, so that the pedestrian clearance, flashing DON'T WALK, is being timed, the pedestrian indication will change from flashing DON'T WALK to steady DON'T WALK because of the advance of switching circuit 20 from position 5 to position 6, but the timing of the pedestrian clearance will continue if such period had not been terminated and at termination of the interval the switching circuit 40 will be advanced into its position 14. Position 14 of the switching circuit 40 is here assumed to be a "built-in" skip step and advance to rest position 11 is automatic.

The side street clearance interval is timed by the Normal Interval Time Circuit which provides for advance of switching circuit 20 to position 7. Position 7 is alternately selectable as an "all red" double clearance or part of the main street green period. With the switch 155 in its illustrated position, the position 7 terminates the side street clearance and accords ROW to main street traffic. Thus the signals AG and BR are illuminated. Position 8 is the main street minimum green interval and is the green interval for main street traffic during which the "assured minimum" green is timed by the Normal Interval Time Circuit.

It may be desired to provide a recall switch so as to provide automatic recall of the side street ROW period. This may be accomplished by providing a call signal through use of a switch connection to OR gate 103 during position 6, the side street clearance period. Such recall switch is not here illustrated as it is believed to be an obvious modification.

*Electronic timing, reset, call and hold circuits—FIG. 3*

Figure 4:
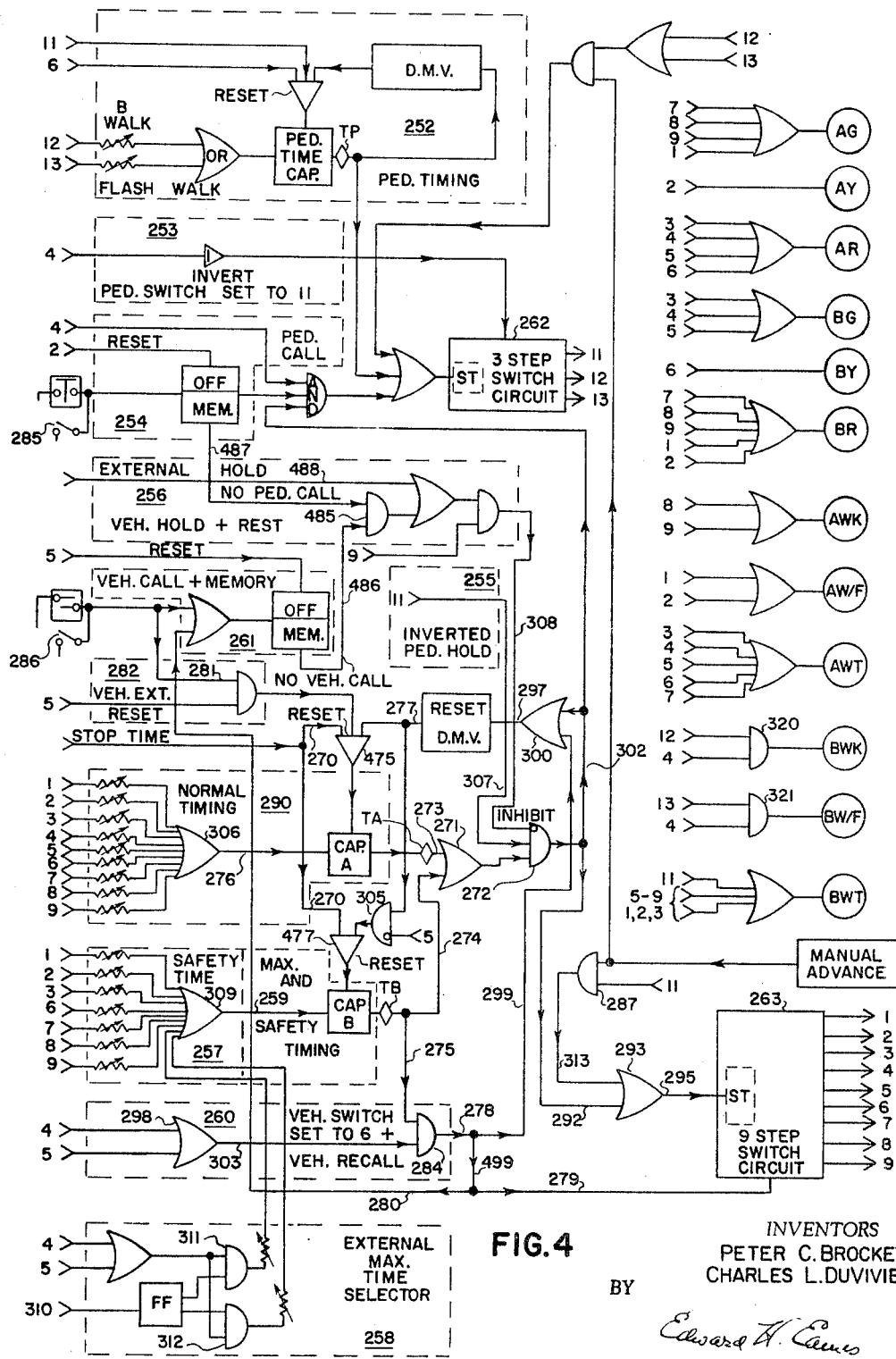
FIG. 4 is a block diagram of another form of the invention representing another form of semiactuated traffic signal control system with an actuated pedestrian phase associated with the actuated vehicle phase and a nonactuated pedestrian phase associated with the nonactuated vehicle phase.
Figure 5:
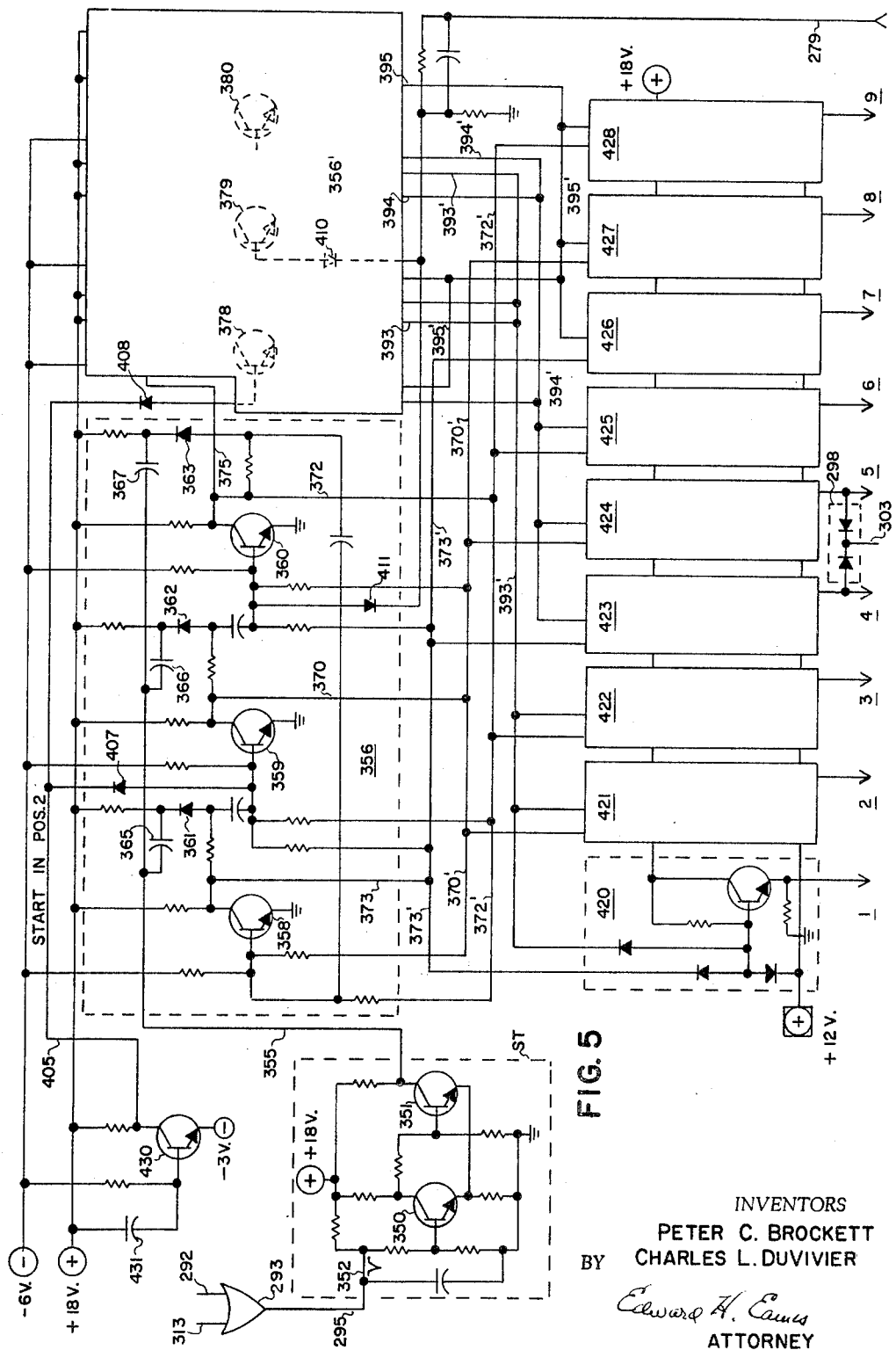
FIG. 5 is a diagram, partly in circuit and partly in block form, including an electronic trinary type step-by-step switching or control circuit and associated diode matrix substantially represented in FIG. 4 by block 263.

Referring generally to FIG. 3, it will be appreciated that although the circuitry illustrated in FIG. 3 is referenced to the block diagram of FIG. 1 certain of the OR gates, AND gates, hold circuitry, memory circuitry, timing circuitry and/or trigger circuitry, for example, represented in block form in FIGS. 4 and 5 may be similar in form to the functionally equivalent circuitry illustrated in FIG. 3, without limitation. It will also be appreciated that although the circuitry illustrated in FIG. 3 is referenced to FIG. 1, other forms of functionally equivalent solid-state circuitry is represented by the blocks in FIG. 1 without limiting such blocks to the form illustrated.

The solid line block 185' in FIG. 3 represents circuitry which is substantially similar to that illustrated in the solid line block 185, except that the block 185' includes one hold input (lead 120) as compared to two hold inputs leads 128 and 127) passing through OR gate 122.

Referring to the RESET circuit in broken line block 160, the transistor 200 is normally held nonconducting so that its collector terminal is highly positive, thereby providing reverse bias to diode 188. This permits capacitor 161 to be charged positively from the positive supply (FIG. 2, for example), through one of the diode matrix sensing circuits, through the series connected timing resistance (shown in block form in FIG. 1) through OR gate 142 and to the capacitor 161 as shown. Capacitor 161 is assumed connected, at its other end, to a common ground. To discharge capacitor 161, transistor 200 is made conductive, which reduces the potential at the collector terminal to substantially ground. Diode 188 is thereby unbiased and the positive charge on capacitor 161 is dissipated through diode 188 and the collector-emitter circuit of transistor 200 to the common ground.

Diode 189 serves as a threshold, the value of which is determined by the potential applied via lead 190. When the charge on capacitor 161 overcomes the threshold level at which diode 189 is held by the potential on lead 190, the charge on capacitor exceeding such threshold is applied to a two stage current amplifier. The amplifier output signal, from the emitter of transistor 202 is applied through a resistance to the junction 123. The potential at junction 123, which is electrically the base terminal of transistor 191, is varied in accordance with the value of the potential applied through the OR gate 122 from lead 127 from the AND gate 119 as controlled by the EXTERNAL HOLD 118 through OR gate 117 and lead 121 or as controlled by the hold signal through INVERTER transistor 116 and lead 121 extending from position 1. With the transistors 201 and 204 of AND gate 119 conducting, the junction 123, serving as INHIBIT gate 123, is held substantially at ground, thereby holding transistor 191 nonconducting The circuit 131, the PED HOLD serves identical purpose, with the circuit controlled by inputs from position 12 or 13 of switching circuit 40 and position 5 of switching circuit 20. Transistor 192 of 131, when conducting, holds lead 128 substantially at ground. This ground potential is passed through OR gate 122 and applied to junction 123, thereby holding transistor 191 nonconductive.

Thus the timing capacitor 161 is permitted to be charged, but termination of a timed interval may be prevented by action of one or the other hold circuits.

When termination of the interval is not prevented (no hold circuit operative) the base terminal of 191 is controlled by the amplifier output signal developed from the charge on the capacitor 161 which is in excess of the threshold level at 189. When transistor 191 becomes conductive, the trigger circuit 132 operates, thereby driving its normally nonconducting transistor 193 to a conductive state. Conduction of transistor 193 reduces the potential at its collector terminal from some positive potential to substantially ground and the negative going pulse is applied, via lead 141 to OR gate 53 and thence through lead 52 to the trigger 50 of the 8 Step Switching Circuit (FIG. 2).

MANUAL ADVANCE 181 of FIG. 1 would be connected into OR gate 53 so as to provide a negative going pulse by manually operating a switch, when desired to manually cycle or advance the switching circuit 20. This connection is not illustrated in FIG. 3.

The broken line blocks 138 and 106 represent circuitry similar to that illustrated in broken line blocks 160 and 132 respectively, while broken line block 139 represents a timing capacitor, such as 161 in 185.

The output of 106 of 185' is a negative going pulse which is similar to the negative going pulse output of 132 of 185 with parallel circuits feeding OR gate 53. The output of block 106 is also applied via lead 109 (109 in the upper right is assumed connected to 109 in the lower left) to provide MAX RECALL of the cross street ROW period.

The circuit in block 104 illustrates one form of memory circuit network.

When memory 104 is in a no-call condition, transistor 195 is conducting and transistor 196 is nonconducting. The collector terminal of transistor 195 is maintained essentially at ground potential, which potential is impressed through OR gate 110 to the base of transistor 116. The collector circuit of transistor 116, which is represented in FIG. 1 as an inverter, when nonconductive is held positive and this positive potential is applied through OR gate 117 to the base of transistor 201. This holds transistor 201 in a conductive condition. When the switching circuit 20 moves into position 1, positive power is applied to the base of transistor 204, thereby making transistor 204 conductive. With transistors 201 and 204 (AND gate 119) in a conductive condition, junction 123 is held essentially at ground potential. By holding junction 123 at ground transistor 191 is prevented from becoming conductive or held nonconductive.

A "call," as by closure of the detector contacts 102, reverses the conductive conditions of transistors 195 and 196. Upon closure of the detector contacts, ground is applied through diode 211 to base of transistor 195 driving the transistor to cut-off. As transistor 195 goes to cut-off its collector terminal goes positive and such potential is applied to the base of transistor 196 through OR gate 103 and drives 196 to a conductive state. The positive potential at the collector of transistor 195 is also applied to the base of transistor 116 which begins to conduct. The collector terminal of transistor 116 goes to essentially ground potential, which is applied to the base of transistor 201 driving transistor 201 to cut-off. Since transistors 201 and 204 are connected in series nonconduction of one of the transistors, for example transistor 201, electrically opens the series circuit and removes the ground potential held at junction 123 and permits junction 123 to rise to some level above ground so that transistor 191 may become conductive. Returning to the "non-call" condition of memory 104, a call in the form of Max Recall is provided when the Max Time Circuit terminates a time period. The negative going pulse output of 106 is applied via lead 109 to line 210 to the base of transistor 196. The positive going portion of the negative going pulse (the terminating edge of the negative going pulse), passes through diode 212 to the base of transistor 196 driving transistor 196 to a conductive condition. The collector of transistor 196 goes essentially to ground and such ground potential is applied to the base of transistor 195 driving transistor 195 to cut-off, thereby resetting memory 104 to a call condition. Memory 104 is held in a non-call condition in position 5 by constant application of positive power through lead 105, thus vehicle calls occurring during position 5 are not "remembered."

In position 5, the vehicle extendible interval, positive potential is applied to the collector circuit of transistor 197 and overcomes any negative potential that may be applied through line 105 to the collector circuit of transistor 197. Since the base of transistor 197 is connected to positive power, transistor 197 becomes conductive. With transistor 197 conducting its collector circuit is substantially at ground potential. Any negative potential that may have been applied via 105 from the negative supply and the ground potential at the collector of 197 are blocked from junction 164' by blocking diode 198. When, in position 5, the detector contacts 102 are closed by passage of a vehicle over such contacts, ground is applied to the base of transistor 197 driving 197 to cut-off. With transistor 197 cut-off, its collector terminal rises to a positive potential which potential passes through diode 198 and junction 164'. Junction 164' and diode 198 are here considered to be part of OR gate 164. The positive potential at the collector of transistor 197 is applied through Zener diode 199 to the base of transistor 200 in reset circuit 160. Transistor 200 becomes conductive which permits dissipation of any charge having accumulated on capacitor 161 thereby resetting capacitor 161 to a ground potential. Upon subsequent opening of the contacts 102, vehicle extension reset circuit 163 is returned to a condition whereby transistor 197 is conducting. With transistor 197 conducting the positive potential is removed from the base of transistor 200 and transistor 200 returns to a nonconducting state and permits the charging of capacitor 161 to begin over again so that another incremental time period may be timed.

When the collector terminal of transistor 197 rises to a positive value as a result of closure of contacts 102 applying ground to the base of 197 the transistor 195 is held conducting by the positive value applied by lead 105 and therefore the memory 104 remains in a non-call condition.

It should be understood that the circuit of memory 113 in block 145 of FIG. 1 may be similar to the circuit of memory 104, illustrated in FIG. 3, except that memory 113 does not include an input from the MAX RECALL so that a lead such as 210, for example, would not be connected to 113. Further, since vehicle reset circuitry is not associated with the pedestrian section, circuitry, such as in block 163, would not be connected to 113. The block 112 would be electrically similar to block 102 in that both block 112 and block 102 provide ground connections when closed. Reset of memory 113 via input 12 and lead 114 may be electrically similar to reset via input lead 5 and lead 105 feeding into memory 104. The output of memory 113, which may provide a vehicle call, is represented in FIG. 1 as lead 115 which is illustrated in FIG. 3 as being connected to junction 110.

It should be noted that certain OR gates in FIG. 1 are represented as junctions in the circuit diagram of FIG. 3.

It should be understood that in other forms of circuitry for providing similar functions as the circuitry shown in FIG. 2 and FIG. 3, isolating diodes or isolating elements or components may be included as part of one or more of the various gate circuits.

The PED HOLD circuit 131 is illustrated as including a transistor 192 which is normally held deenergized by its connection at its base terminal to the negative power 17 applied through resistor 215.

In position 12 or position 13 of the switching circuit 40, positive power is applied to the input terminals 12 and 13 respectivety. In absence of positive power being applied to input terminal 5 at the same time, i.e., when the switching circuit 20 is in a position other than 5, the input terminal 5 is returned to ground, and negative power applied through resistor 215 from lead 17 returns to the common ground through terminal 5. (It is assumed here that in absence of an input terminal being held positive, it is returned to ground.) Thus the base of transistor 192 is held negative and transistor 192 is held nonconductive, with its collector terminal held positive.

If however, either input terminal 12 or 13 has positive power applied thereto and input terminal 5 also has positive power applied thereto then the negative power through resistor 215 is overcome and the base of transistor 192 becomes positive thereby driving 192 to a conductive state. With transistor 192 conducting, ground is applied through line 128 to OR gate 122 and to Inhibit gate 123. It will be seen that input terminal 12 or 13 feed power to a junction which requires positive power from input position 12 or 13 and position 5 to drive the junction positive, thereby driving the base of transistor 192 positive. Thus, as seen in FIG. 1, positive power from 12 or 13 may be applied to the OR gate in 131 which passes such positive power to the AND gate so that input from 12 or 13 and input from 5 cooperate to affect a hold on the timing circuit 125 via Inhibit gate 123.

Action of the hold circuit 131 is similar to that described for the vehicle hold via AND gate 119 and lead 127 except that a hold via lead 127, is applied to Inhibit gate 126 of the MAX Time Circuit via line 120 as well as Inhibit gate 123 of the Normal Interval Time Circuit. The hold applied to Inhibit gate 123 of the Normal Interval Time Circuit via lead 128 is not applied to the Inhibit gate (126) of the MAX Time Circuit. The hold circuit 131 acts to hold the Normal Interval Time Circuit from terminating any time interval when such hold circuit is effective but does not hold the MAX Time Circuit, therefore the Max Time Circuit is free to terminate the interval then being timed.

When the trigger 132 operates to terminate an interval timed by the normal interval time circuit, the negative going pulse output from the collector circuit of transistor 193 is applied to lead 166 to the base of transistor 217. Transistor 217 is driven to cut-off and its collector terminal rises to a positive potential. The positive potential passes through diode 218 of OR gate 164 (including junction 164'), through the Zener diode 199 to the base of transistor 200 thereby driving transistor 200 to a conductive state. Reset of capacitor 161 by action of the reset circuit 160 is also provided through the AND gate 164 by driving transistor 219 to a nonconductive state by a negative going pulse from trigger 106 in block 185'. When 219 is driven to cut-off the positive potential at its collector passes via lead 108 through diode 220 of AND gate 164 to the reset circuit 160.

When transistor 219 is driven to a nonconductive state by operation of the trigger circuit 106, positive potential is applied via lead 140 to OR gate 137. The positive potential passes through OR gate 137 to reset circuit 138. Reset of the max time circuit is accomplished by cut-off of transistor 217 through application of a positive potential through diode 136, in AND gate 137, in all positions except position 5. In position 5, transistor 134 (representing INHIBIT gate 134), is driven to a state of conduction by positive power which, applied in position 5, overcomes the negative power applied through resistance 222 to the base of transistor 134. Thus in position 5, transistor 134 is driven to a conductive state and the ground potential at its collector terminal is applied to the junction 223, thereby blocking or inhibiting any positive potential attempted to be applied to reset circuit 138, while transistor 134 is in a conductive state.

The lines 230 and 231 extending from block 185 and 185' respectively represent leads which are energized when the trigger circuit with which the respective lead is associated is triggered. Such lead may be used to connect to an indicator lamp or other indicator, which may show when the trigger 132 or 106 respectively have operated to terminate the interval.

Lead 168 extending substantially from the collector terminal of transistor 219 illustrates the circuitry for providing a positive pulse to block 167, RESET TO POS 6.

Referring back to FIG. 1, the OR gate 174 of block 167 is shown in circuit form in FIG. 2. Broken line block 174 in FIG. 2 shows that the inputs into block 174 are from leads 32' and 43'. It will be seen that both leads 32' and 43' common to positions 4 and 5 are held positive in positions 4 and 5. The output of OR gate 174 is via lead 182 into AND gate 169 which includes the resistance on lead 182 and the diode on lead 168. In positions 4 and 5, passage of a positive pulse from 168 is unblocked so that such pulse may be applied via lead 170 to the capacitors 171, 172 and 173 and drive the flip-flops 21, 31 and 41 to predetermined conditions, as desired.

It should be understood that only certain of the circuitry of the present invention is illustrated in circuit form. It is believed that the remaining part of the timing circuits that are not illustrated will be obvious to those skilled in the art, as will be the signal circuits.

*Alternate form of semi-actuated controller—Fig. 4*

Referring now to FIG. 4, another form of semiactuated traffic control system is presented in logic, block diagram, the logic and circuitry of which differs somewhat from the logic and form of semiactuated traffic control system represented in logic form in FIG. 1.

In addition to various circuit differences between the systems in FIGS. 1 and 4, the system in FIG. 4 includes a reset delay multivibrator (RESET D.M.V.) which is common to both the normal timing circuit and the safety and maximum timing circuit. The output of each of the triggers TA and TB of each timing circuit respectively, is applied to a common OR gate 271 via leads 273 and 274 respectively with the output of the OR gate 271 applied to a combination AND and INHIBIT gate 272. The output of gate 272 normally serves as a trigger pulse which actuates the stepping and reset functions of the vehicle section of the control system. The INVERTED PED (pedestrian) HOLD, block 255 output is also fed to gate 272 to cooperate with the output of OR gate 271 as an AND gate function so that the trigger pulse from TA or TB passing through OR gate 271 will pass through AND gate 272 only when there is a pulse or signal applied to the gate 272 via position 11 of the 3 STEP SWITCH (switching) CIRCUIT. This action is functionally an inverted pedestrian hold effect since it is intended to prevent passage of the trigger pulse through gate 272 in positions 12 and 13 of the pedestrian section switching circuit, the 3 STEP SWITCH CIRCUIT 262. The inhibit function of gate 272 is provided from the VEH (vehicle) HOLD+REST, block 256, which provides a hold signal to inhibit passage of the trigger pulse or signal through 272 when there is no pedestrian call

*and* no vehicle call *or* the external hold is operated *and* the vehicle section switching circuit 9 STEP SWITCH CIRCUIT, block 263, is in position 9. Another distinguishing feature is the use of a nine position switch circuit in the vehicle section and a three position switch circuit in the pedestrian section. This is more clearly shown in FIG. 5, the circuit form of block 263. Another distinguishing feature is the EXTERNAL MAX. (maximum) TIME SELECTOR, block 258 which includes an input 310 which may be manual, for operating the flip-flop FF so as to provide one or another of its two outputs (only one at a time is energized) so as to cooperate with the inputs from positions 4 or 5 at AND gate 311 or 312, according to which output of the flip-flop is energized or activated, so as to select between a pair of adjustable timing resistors so that a selection between two maximum time intervals may be made.

Termination of the maximum limit time interval, the maximum time that the cross-street green signal may be displayed, is a departure from the form shown in FIG. 1, such termination being accomplished by inhibiting passage of the trigger signal or pulse through gate 272 and providing passage of such trigger signal or pulse via lead 275 through AND gate 284 when the 9 step switching circuit is in position 4 or 5. Under such condition, such trigger signal or pulse is applied, via leads 278 and 279, to drive the 9 Step Switching Circuit to its position 6. Such trigger signal or pulse is also applied via leads 278 and 280 to the OR gate in block 261, VEH (vehicle) CALL+MEMORY for recall of the actuated (cross-street) phase.

In order to insure that the 3 Step Switching Circuit will be returned to its rest position (position 11) the PED (pedestrian) SWITCH SET TO 11, block 253 includes a signal inverter (INVERT) so as to set the switch circuit 262 to position 11 and hold in position 11 in all positions of the vehicle switching circuit except position 4.

Another difference between FIG. 1 and FIG. 4 is the use of the delay multivibrator (D.M.V.) for providing reset of the pedestrian timing capacitor (PED TIME CAP). The pedestrian time capacitor (PED TIME CAP) is also reset in position 11 of the pedestrian switching circuit and in position 6 of the vehicle switching circuit through operation of its reset (RESET) circuit.

In FIG. 4 recall switches 285 and 286 are shown for providing recall of the cross-street pedestrian right-of-way period and the cross-street vehicle right-of-way period respectively, which switches were omitted from FIG. 1. Such switches would be connected so as to provide a call for the actuated phase (switch 285 pedestrian and switch 286 vehicle), when the switch is closed, in position 11 of the pedestrian switching circuit and in position 6 of the vehicle switching circuit respectively.

Manual operation of the system also differs from that shown in FIG. 1 in that FIG. 4 shows that manual advance of the vehicle switching circuit is dependent upon the pedestrian switching circuit being in its rest position, position 11. (See AND gate 287.) If the pedestrian switching circuit is in a position other than 11, the manual advance first drives the pedestrian switching circuit, 262, through its positions to position 11 and thereafter manual advance of the vehicle switching circuit, 263, may be accomplished.

As for the signal circuits, it will be seen that the main street (phase A) vehicle signals and the cross-street (phase B) vehicle signals are provided with main street vehicle green (AG) in positions 7, 8, 9 and 1, main street vehicle clearance (AY) in position 2 with the cross street vehicle red (BR) overlapping the main street vehicle green and clearance signals in positions 7, 8, 9, 1 and 2. The cross street vehicle green (BG) is provided in positions 3, 4 and 5 with the cross street vehicle clearance (BY) in position 6 and the main street vehicle red (AR) overlapping the cross street green and clearance vehicle signals in positions 3, 4, 5 and 6.

In the signal circuit arrangement in FIG. 4, main street pedestrian right-of-way signals are provided with pedestrian walk (AWK) displayed in positions 8 and 9, the pedestrian clearance (AW/F) provided in positions 1 and 2. It will be noted that the main street pedestrian walk and flashing walk or flashing don't walk signals, constituting the main street pedestrian right-of-way are timed by the vehicle section timing of the system.

The cross street pedestrian right-of-way signals of walk (BWK) and clearance (BW/F) are illuminated through the coordinated positions of the pedestrian switching circuit 262 in position 12 *and* the vehicle switching circuit 263 in position 4 for walk as indicated by AND gate 320 and in position 13 of 262 and a position 4 of 263 for the clearance as indicated by AND gate 321. The signal BWT, wait or don't walk signal, is displayed in position 11 of switching circuit 262 *or* positions 5 through 9, 1, 2 and 3 of switching circuit 263.

Referring in general to FIG. 4, the logic diagram may conveniently be separated into three sections; a pedestrian section, a vehicle section and a coordinating section. The pedestrian section may include blocks 252, PED (pedestrian) TIMING; 253, PED (pedestrian) SET TO 11; 254, PED (pedestrian) CALL, and 262, 3 STEP SWITCH CIRCUIT. The vehicle section may include blocks 261, VEH (vehicle) CALL+(plus) MEMORY; 290, NORMAL TIMING; 257, SAFETY TIME; 260, VEH (vehicle) SWITCH SET TO 6 + (plus) VEH. (vehicle) RECALL; 258, EXTERNAL MAX (maximum) TIME SELECTOR; 263, 9 STEP SWITCH CIRCUIT; 282, VEH (vehicle) EXT (extension) RESET and the block RESET D.M.V. delay multivibrator.

The coordinating sections may include blocks 256, VEH (vehicle) HOLD + (plus) REST and 255, INVERTED PED (pedestrian) HOLD.

*Details of nine-step dual ternary switching circuit of FIG. 5*

Referring more fully to FIG. 5, the diagram, partly in circuit and partly in block form substantially illustrates the electrical contents of block 263, in its preferred form.

Generally, the OR gate 293 and input leads 292 and 313, each of which also appear in FIG. 4, are shown in FIG. 5 with lead 295 feeding into a trigger circuit in broken line block ST. The circuitry in broken line block ST in FIG. 5 may illustrate the circuitry represented in broken line block ST in block 263 and in block 262 in FIG. 4.

Those skilled in the art will be aware that the circuitry in broken line block ST is one form of multivibrator, which may be the well known Schmitt trigger or Schmidt trigger.

Block ST includes two transistors 350 and 351, which are normally in opposite conditions of conduction with transistor 350 normally conducting and 351 normally non-conducting.

In its preferred form, as will be described relative to FIG. 6, the output of the trigger TA or TB through gate 272 is a negative going pulse. The output of gate 272 is fed through lead 292, OR gate 293 and lead 295 to the base terminal of transistor 350. A negative going pulse induction is shown below the lead 352. Such negative going pulse drives transistor 350 to cutoff, thereby increasing, in a positive direction, the potential at the collector terminal of transistor 350 and at the base terminal of transistor 351. Transistor 351 is driven to conduction and its collector terminal is driven from a high positive potential toward ground, thereby providing a negative going pulse via lead 355 to the trinary counting circuit in broken line block 356.

The condition of the transistors 350 and 351 (350 non-conducting and 351 conducting) is an unstable condition and will be maintained only so long as the base of transistor 350 is held below its normally relatively high positive potential, by the negative going pulse on lead 352.

When the negative going pulse from leads 295 and 352 are removed, the transistors 350 and 351 will revert to their normal conduction and nonconduction condition respectively. Upon resuming their normal condition, the relatively low potential on lead 355 returns to its normally high positive condition.

Generally, the circuitry in broken line block 356 is a base three (ternary) counting circuit employing collector controlled diode steering circuits for sequence control. In its quiescent state, two of the three transistors are conducting and the third is nonconducting. The base-three or three-stage counting circuit is also referred to as a trinary counting circuit.

Let it be assumed that transistor 358 is nonconducting and transistors 359 and 360 are conducting. With transistor 358 nonconducting, its collector terminal is substantially above ground potential and the bias across diode 361 is substantially reduced to a very low value. With transistor 359 conducting, its collector terminal is substantially at ground potential so that the bias across diode 362 is held at a substantially high value.

With transistor 360 conducting, high bias is also held across diode 363.

A negative going pulse from the circuit ST passed to the ternary or trinary counting circuit 356 via lead 355 is applied to the capacitors 365, 366 and 367. Since both diodes 362 and 363 are held at high bias and diode 361 has substantially little or no bias, the negative pulse passes through diode 361 to the base of transistor 359 driving transistor 359 to nonconduction. The collector terminal of 359 goes positive and such positive potential is applied via lead 370 and 370′ to the base of transistors 358 and 360. The positive potential on lead 370′ maintains transistor 360 in its conductive state and drives transistor 358 into conduction. The positive potential at the collector of transistor 359 thereafter holds both transistors 358 and 360 conductive, thus the base three or three-stage counting circuit is held in a quiescent state with transistors 358 and 360 conductive and 359 nonconductive, and with diodes 361 and 363 highly biased and 362 with substantially little or no bias.

The next succeeding negative going pulse via lead 355 will now pass through the unbiased diode 362 to the base of transistor 360 driving transistor 360 to cutoff. The collector terminal of transistor 360 and leads 372 and 372′ go to a highly positive potential from substantially ground and such positive potential is applied to the base of transistors 358 and 359 thereby maintaining 358 conductive and driving transistor 359 from nonconduction to conduction.

In this condition, diodes 361 and 362 are at high bias and diode 363 is held at substantially little or no bias.

The next or third succeeding negative going pulse from lead 355 passes through unbiased diode 363 to the base of transistor 358, thereby driving 358 to a nonconductive state. The positive potential at its collector terminal is applied via leads 373 and 373′ to the base of transistors 359 and 360, thereby holding transistor 359 conductive and driving transistor 360 to a conductive state. The high bias across diode 361 is reduced and the bias across diode 362 is maintained high while the bias across diode 363 is increased when transistor 360 becomes conductive. Diode 361 is thus prepared to pass the next appearing negative going pulse to the base of transistor 359.

When transistor 360 was driven from a nonconductive state to a conductive state, its collector terminal went from a high positive potential to substantially ground, and the negative going pulse at its collector is fed through lead 375 into block 356′ which represents a second base three counting circuit, substantially similar to the circuitry in block 356 except for the inputs shown in broken line form.

Thus, it will be seen that a succession of negative going pulse inputs into the ternary counter will sequentially step the three-stage counting circuit through a sequence of steps.

Referring to block 356′, this block represents a second base three or three-stage counting circuit using collector controlled diode steering circuits for sequence control with its input at lead 375. Each time transistor 360 goes from nonconducting to conducting, its collector will go from a high positive potential to substantially ground potential, thereby providing a negative going pulse via lead 375 to the ternary counting circuit in block 356′.

Functionally, the circuit in block 356′ is similar to that described relative to the ternary circuit of block 356. Thus, when transistor 378 is nonconducting, transistors 379 and 380 are held conducting via the positive output via leads 393 and 393′ and the diode controlled by the collector terminnal of transistor 378 is unbiased. A negative going pulse fed via lead 375 will pass through the unbiased diode to the base of transistor 379 while the negative going pulse is blocked by the high bias held on the diodes associated with the collector terminals of transistors 379 and 380.

When transistor 379 is nonconducting, its collector terminal goes highly positive and applies the positive potential to leads 394 and 394′, thereby holding transistors 378 and 380 conducting and the diode associated with the collector terminal of transistor 379 unbiased, thereby directing the next negative going pulse from 375 to the base of transistor 380. When transistor 380 becomes nonconductive, its collector terminal becomes highly positive and the positive potential is fed via leads 395 and 395′ to the base of transistors 378 and 379, and drive and/or hold the transistors 378 and 379 to a conductive state.

Thus, it will be seen that each time the ternary or trinary circuit 356 is sequentially stepped through its sequence, in digital fashion, so as to drive transistor 360 from nonconduction to conduction, a negative going pulse is applied to drive the ternary or trinary circuit 356′, in digital fashion. Thus, in sequence at least, two of the six leads 373′, 370, 372′, 395′, 394′ and/or 393′ will be positive at a time, thereby providing nine combinations of two positive leads at a time so that a matrix is provided to sense the various combinations of positive potential and are arranged so as to provide a sequentially stepped output of nine sequential steps, the action of which is similar to that described relative to the diode matrix in FIG. 2. However, it will be noticed that the diode matrix of FIG. 2 senses the conditions of three output leads while the diode matrix of FIG. 5 senses the condition of two output leads.

In the upper left corner of FIG. 5, a starting circuit is presented which, when power is turned on, after having been off, provides a negative going pulse via lead 405 to drive the ternary switching circuit into its position 2. Lead 405 feeds through diode 407 to the base of transistor 359 and through diode 408 to the base of transistor 378, thereby driving both 359 and 378 to cut-off. Thus, the ternary switching circuit may be set in position 2. Transistor 430 is normally held non-conducting by application of a negative potential to its base terminal. When power is initially applied to the apparatus or is returned after having been turned off, the increasing positive supply passes through capacitor 431 to the base of transistor 430, thereby driving 430 to conduction. In its stable condition, capacitor 431 blocks the positive +18 volt D.C. supply and the negative −6 volt D.C. supply holds transistor 430 cut-off.

Lead 279 in FIG. 5 is an input similar to lead 279 in FIG. 4. Lead 279 in FIG. 4 is an extension of lead 278 which is the output of the vehicle switch set to 6 block. In its preferred form, a negative going pulse is fed via lead 279 which is applied via the lead 279 and diode 410, shown in broken line form, to drive transistor 379 to cut-off and via the lead 279 and diode 411 to drive transistor 360 to cut-off thereby causing leads 394 and 372 to become positive, to which the diode matrix sensing circuit 425 will respond and provide an output at position 6.

The leads 1 through 9 of FIG. 5 are considered output leads which correspond to the nine output leads of the block 263 in FIG. 4. In the preferred form, one output lead, 1 through 9, at a time becomes positive, while all others are returned to ground. The lead of the 1 through 9 leads which is positive indicates the position or step in which the controller is then in.

The diode matrix, of which broken line block 420 shows the circuitry and the blocks 421 through 428 represent similar circuits, each sense the condition of a different pair or combination of two leads from the six outputs of the two trinary counting circuits.

The diode matrix sensing circuits of FIG. 5 are similar to the diode matrix sensing circuits of FIG. 2, except that each diode sensing circuit of FIG. 2 provides an output in response to sensing three outputs of the three-stage binary switching circuit, rather than the sensing circuits each providing an output in response to sensing the condition of two outputs of the two-stage trinary switching circuit.

In block 260 in FIG. 4, an OR gate 298 and output 303 are represented. In FIG. 5, the broken line block 298 illustrates the OR gate 298 with input from positions 4 and 5 with lead 303 illustrating the output of OR gate 298.

The block 262 in FIG. 4 represents a three-step switch circuit from which three outputs 11, 12 and 13 are provided. The broken line block ST in block 262 may be similar to the circuitry shown in the broken line block ST in FIG. 5.

The three-step switch circuit 262 in FIG. 4, may be similar in most respects to the base three counting circuit illustrated in broken line block 356 in FIG. 5. It will be appreciated, however, that the START IN POS 2 circuit would not be included in the circuit of the three-step switch circuit and the circuitry to set to position 6 would also be deleted.

It will also be appreciated that the lead from block 253 which may set and/or hold the three-step switch circuit in its position 11 would be fed through a diode, similar in direction as 407 but arranged to feed a signal substantially negative with respect to the +18 volt supply, to the transistor which is normally non-conducting when the trinary counting circuit is providing a positive output through its output lead 11.

It will also be appreciated that since only three positions or outputs are provided, the block 356' would be eliminated from the 3 step switch circuit and the sensing circuits of the diode matrix would be unnecessary. Suitable gating of the positive potential from the collector terminal of the transistors may be used to prevent any electrical feedback and yet provide the positive potential output desired.

Timing and reset circuitry of FIG. 6

Referring now to FIG. 6, the preferred form of reset multivibrator, reset control circuit, normal time circuit and safety and maximum time circuit, represented in FIG. 4, are illustrated in circuit form with inputs and outputs correlated to the logic diagram of FIG. 4.

OR gate 306 in FIG. 6, corresponds to OR gate 306 in FIG. 4 with lead 276 representing the conductor for the controlled charging voltage for progressively charging the timing capacitor CAP A (hereinafter referred to as A). The field effect transistor 441 effectively isolates capacitor A, serving as a reversed solid-state cathode follower which senses the increasing potential across the timing capacitor while it is progressively charged for timing purposes.

As the potential across the timing capacitor A increases conduction through the field effect transistor 441 decreases and the potential at junction 440 will thereafter follow the potential across the timing capacitor.

The emitter terminal of transistor 442 is held somewhat above ground by its connection to an interim point on the potential divided, between +12 volts D.C. (direct current) and ground. This connection provides a threshold value to which the potential at junction 440 must be lifted and overcome before transistor 442 may conduct.

When the potential across timing capacitor A rises sufficiently so that the potential at junction 440, which follows the potential across capacitor A, overcomes the threshold, normally non-conducting transistor 442 conducts, thereby reducing the potential at its collector terminal toward ground, which lower potential drives transistor 443 to cutoff.

When transistor 443 goes nonconductive, its collector terminal goes more positive and such increasing positive potential is applied through OR gate 271 via lead 273 to the base of transistor 455, thereby driving transistor 455 to conduction.

OR gate 309 in FIG. 6 corresponds to OR gate 309 in FIG. 4 with lead 259 representing the conductor for the controlled charging voltage for progressively charging the timing capacitor CAP B (hereinafter referred to as B). It will be noticed that the charging circuit for capacitor B and the field effect transistor 451 and trigger TB, including transistors 452 and 453 of the safety and maximum time circuit are identical in form and circuitry to the corresponding parts of the normal time circuit described above. Thus when transistor 453 goes to cutoff a positive potential is applied via lead 274 to OR gate 271, with identical effect on transistor 455 as the effect of the positive potential from lead 273.

Thus it will be seen that a trigger pulse from either the normal time circuit *or* the safety and maximum time circuit may drive transistor 455 to conduction via passage of either trigger pulse through the common OR gate 271.

Broken line block 272 in FIG. 6 illustrates the combination AND and INHIBIT gate 272 represented in FIG. 4.

Lead 307 in FIG. 6 corresponds to lead 307 in FIG. 4 and in positions 12 and 13 the input is at ground potential thereby holding transistor 460 cutoff and holding its collector terminal at positive potential. The positive potential at the collector terminal of 460 is applied to the base of transistor 458 holding transistor 458 conductive.

In the absence of a trigger pulse from either TA or TB transistor 455 is held nonconductive and its collector terminal is substantially at positive potential. Such positive potential is applied through resistor 456 to the base of transistor 458 to thereby hold 458 conductive.

Thus in position 12 or 13 or in the absence of a trigger pulse from TA or TB transistor 458 is held conductive.

The AND function of gate 272 is such that the lead 307 must be positive (as with switch circuit 262 in position 11) so as to permit transistor 460 to conduct *and* a trigger pulse from gate 271 must appear to cause transistor 455 to conduct. Ignoring momentarily the INHIBIT function of gate 272, the combination of a positive potential via lead 307 causing transistor 460 to conduct and a positive potential from OR gate 271, causing transistor 455 to conduct, so that both potentials via 456 and 461 applied to the base of transistor 458 are at substantially ground potential, will drive transistor 458 to cutoff thereby driving its collector terminal from substantially ground potential to some positive potential, thereby driving normally nonconducting transistor 463 to conduction.

When transistor 463 goes from nonconduction to conduction its collector terminal goes from a positive potential to substantially ground and the negative going pulse is applied via lead 292 to OR gate 293 lead 295 to block ST. (See FIGS. 4 and 5.)

The negative going pulse is also applied via lead 302 to OR gate 300 to the reset multivibrator via lead 297.

Transistors 470 and 471 are part of the reset multivibrator with transistor 470 normally held nonconducting through application of a negative (−6 volts) potential to its base, and transistor 471 normally held conducting. The negative going pulse applied via lead 302, OR gate 300 and lead 297 to the base of transistor 471 drives 471 to cutoff. With transistor 471 cutoff, its collector terminal goes positive and such positive potential is applied via lead 277 through resistor 474 to the base of transistor 475, and through resistor 476 to the base of transistor 477.

Transistor 475 serves as the reset control for the normal time circuit and transistor 477 serves as the reset control for the safety and maximum time circuit.

With respect to reset by the reset multivibrator, both reset circuits operate in a similar manner, except that under certain conditions (the vehicle section switching circuit in position 5) transistor 477 may be prevented from resetting or reducing the charge on timing capacitor B (this is accomplished by INHIBIT gate 305). During the time the vehicle switching circuit is in its position 5 operation of the reset circuit for resetting or reducing the charge on timing capacitor A is accomplished with each actuation of the vehicle detector (this accomplished by the circuitry in block 282).

Transistor 475 (and 477) is normally held nonconducting (through normally holding transistor 471 conducting). To accomplish reset of capacitor A (and/or B) by action of the reset multivibrator, transistor 471 is driven to cutoff which provides a positive potential to the base of transistor 475 (and 477) thereby driving transistor 475 (477) to conduct. Conduction of transistor 475 (477) provides a path to ground so that any accumulated charge on timing capacitor A (B) is discharged through the collector to emitter terminal circuit of the reset control transistor.

In the present circuit form as herein presented discharge of both timing capacitors (except capacitor B in position 5) is accomplished at the beginning of the interval to be timed. In position 5 positive power is applied via output lead 5 to normally nonconducting transistor 480 which causes 480 to conduct. Conduction of transistor 480 provides a path to ground for any positive pulse appearing through resistor 476 and holds the base of transistor 477 at substantially ground potential thereby inhibiting reset of capacitor B by prohibiting conduction of transistor 477. In this manner the maximum time limit that the controller may remain in the combined position 4 and 5 is timed by the maximum time circuit. During positions 4 and 5 the capacitor B is charged through the charging resistor (through AND gate 311 or 312 in FIG. 4) which is adjusted so as to more slowly charge the capacitor B and thereby time the maximum limit time that the controller may regain in the combined positions 4 and 5.

It will be noted that capacitor A is not prevented from being discharged or reset at the beginning of position 5, however, broken line block 282 illustrates circuitry to cause reset of capacitor A during position 5 in response to a vehicle actuation, for vehicle extension of the extendible vehicle interval, through such reset.

AND gate 282 is arranged so that when a positive signal, in position 5 of the 9 step switch circuit, 263, is applied via lead 482 *and* a detector signal via lead 281 are present simultaneously at junction 483, this combined signal is applied to the base of transistor 475 to cause it to conduct, discharging the capacitor A and resetting the time interval of the normal time circuit.

Broken line block 272 has been referred to as a combination AND gate and INHIBIT gate of which the *and* function has been described. Broken line block 256 in FIG. 6 illustrates circuitry to perform the vehicle hold and rest function in which passage of a pulse from gate 272 to the base of transistor 458 to cause 458 to conduct may be inhibited. Block 256 in FIG. 4 shows in logic form the functions accomplished by the circuitry in broken line block 256 in FIG. 6.

If there is no call from the pedestrian call memory *and* no call from the cross street vehicle call memory (see blocks 254, 261 and 256 in FIG. 4) substantially positive signals indicating such condition will appear on leads 486 and 487 and will be passed by AND gate 485 *or* if there is positive external hold signal, (an external hold signal on lead 488 compares to the output of AND gate 486) *and* the vehicle switching circuit is in position 9 (so that the input 9 is positive) this combination will provide a positive inhibit signal via lead 308 to the combination AND and INHIBIT gate 272 to prevent cutoff of transistor 458 and hold the controller in its rest position, position 9.

To provide the inhibit action to hold transistor 458 conductive the lead 308 is driven from essentially ground potential to a substantially positive value. With a positive potential on lead 308 the positive potential, on lead 490 normally returned to ground through one of the circuits in block 256, is applied to the base of reset control transistor 477 via lead 491 and causes 477 to become conductive thereby preventing timing capacitor B from charging. This prevents the safety and maximum time circuit from starting its timing function. Inhibiting cutoffff of transistor 458 will prevent termination of position 9 by the normal time circuit.

Although the holding of the safety and maximum time circuit is not necessary in the circuit in FIG. 6 such circuit is an important part of a full actuated type controller appearing in logic form in FIG. 7, to be discussed below.

It has been described that the safety and maximum time circuit is prevented from being reset at the beginning of position 5 so as to provide a maximum limit time that the actuated phase (cross street phase) may accord green right-of-way to cross street traffic and that during position 5 the normal time circuit may be reset upon vehicle actuation.

In the event that the normal time circuit has been prevented from terminating the extendible interval, as by timely reset through vehicle actuation, the total green period will be held for the maximum time limit as timed by the maximum time circuit.

Under such conditions, upon operation of the trigger TB, at the end of the maximum limit time period, the positive going output pulse of trigger TB is applied to lead 274 as previously described and is also applied through lead 495 to the base of transistor 496 thereby driving normally nonconducting transistor 496 to conduction. Upon 496 becoming conductive the collector terminal of 496 goes essentially to ground and the ground potential is applied via lead 275 to the base of transistor 497. In position 5 (and also in position 4 to provide an additional safety measure and prevent the possibility of "hang-up" or the controller failing to leave position 4 for one reason or another) positive power from output lead 5 and 4) is applied thrugh OR gate 298 and via lead 303 to the collector of transistor 497 and to the base of transistor 498 respectively.

Transistors 497 and 498 are connected to function as an AND gate. Transistor 497 is normally held conducting by the positive potential at the collector of normally non-conducting transistor 496, via lead 275. Transistor 498 is normally non-conducting by virtue of the substantially ground potential at the collector of transistor 497. In positions 4 or 5 positive power passes through OR gate 298 and via lead 303 to the collector of transistor 497. This positive potential is normally passed through the collector to emitter circuit of 497 to ground.

When in position 4 or 5 the time interval is terminated by operation of the trigger TB, transistor 496 is driven into conduction and the collector goes from a substantially positive potential to essentially ground potential. The ground potential is applied via lead 275 to the base of transistor 497 thereby driving 497 to cutoff. The positive potential via lead 303 is passed to the base of transistor 498 causing 498 to conduct, which drives the potential on lead 278 to substantially ground potential which constitutes a negative going pulse. The negative going pulse is applied via lead 299 to OR gate 300 and lead 297 to cause the reset relay multivibrator to operate to effect reset of both timing circuits as previously described. The negative going pulse at lead 278 is also applied via lead 499 to lead 279 (see FIGS. 4 and 5 also) to cause the vehicle switching circuit of FIG. 6 to be driven from position 5 (or position 4) to position 6. The negative going pulse appearing on lead 278 is also applied via lead 499 to lead 280 which conducts such pulse to the memory of the vehicle section and serves to recall the actuated phase.

The circuitry of the detector circuit and memory circuit represented in FIG. 4 may be similar to the circuitry 102 and 164 illustrating such components in FIG. 3. Thus for recall of the actuated phase the lead 280 of FIG. 6 would connect with lead 109 in the lower left corner of FIG. 3. Lead 486 of FIGS. 4 and 6 compare with the lead extending to junction 110 in FIG. 3 but without the junction itself. The input from output lead 5 into the memory in FIG. 4 compares with such input via lead 105 in FIG. 3. However, the block 163 of FIG. 3, for vehicle extension reset would be eliminated from the components of FIGS. 4 and 6 since vehicle reset of the extendible time interval in the system of FIGS. 4 and 6 differs somewhat from the circuit described in FIG. 3, as previously described.

The pedestrian memory circuit for the system represented in FIG. 4 may be similar to that described relative to FIGS. 1 and 3 with the lead 487 of FIGS. 4 and 6 comparing functionally with the lead extending to, but not including junction 110 in FIG. 3.

It was previously described, relative to FIG. 1 that an all red signal period (both main street red and cross street red illuminated simultaneously) could be provided by selected positioning of switch 155. This feature was not included in the signal circuit features of FIG. 4 although such selection circuitry could be includede in the signal circuitry in FIG. 4. All red intervals could be provided for a position 7, between change of right-of-way from cross street to main street traffic and/or in position 3, between change of right-of-way from main street right-of-way to cross street right-of-way.

*Five types of semi-and full actuated traffic signal controllers—FIG. 7*

Referring now to FIG. 7 a logic form block diagram is presented representing, a family of solid-state traffic signal controllers. This complex of some five related solid-state traffic signal controllers includes 24 two-position switches S1 through S24, which may be positioned as shown in the chart below so as to provide:

Type 1.—A semiactuated two phase traffic signal controller without actuated pedestrian phase;
Type 2.—A semiactuated two phase traffic signal controller with an actuated pedestrian phase associated with the vehicle actuated phase;
Type 3.—A full actuated two phase traffic signal controller without actuated pedestrian phase;
Type 4.—A full actuated two phase traffic signal controller with an actuated pedestrian phase associated with one of the vehicle actuated phases, and
Type 5.—A full actuated two phase traffic signal controller with actuated pedestrian phases associated with each vehicle actuated phase.

Each of the 24 switches may be positioned individually to a terminal $a$ or $b$. In accordance with the chart below the switches S1 through S24 may all be positioned to their respective terminals $b$ for providing a traffic controller of Type 1 and by positioning all the switches S1 through S24 to their respective terminals $a$, as illustrated, a traffic signal controller of Type 5 may be provided.

For providing traffic signal controllers of Type 2, Type 3 and Type 4, reference to the accompanying chart may be made.

| Switches | Type 1 | Type 2 | Type 3 | Type 4 | Type 5 |
|---|---|---|---|---|---|
| | Switch Positions | | | | |
| S1  | b | a | a | a | a |
| S2  | b | b | a | a | a |
| S3  | b | b | a | a | a |
| S4  | b | b | b | a | a |
| S5  | b | b | a | a | a |
| S6  | b | a | b | a | a |
| S7  | b | b | a | a | a |
| S8  | b | b | a | a | a |
| S9  | b | a | b | a | a |
| S10 | b | b | a | a | a |
| S11 | b | b | b | b | a |
| S12 | b | b | b | b | a |
| S13 | b | b | a | a | a |
| S14 | b | a | b | a | a |
| S15 | b | b | a | a | a |
| S16 | b | b | b | b | a |
| S17 | b | b | b | a | a |
| S18 | b | b | a | a | a |
| S19 | b | b | b | a | a |
| S20 | b | a | b | a | a |
| S21 | b | b | a | a | a |
| S22 | b | b | a | b | a |
| S23 | b | b | b | b | a |
| S24 | b | b | b | b | a |

The legends of FIG. 7 have been abbreviated and the definitions of such abbreviations are as follows:

AI=Initial interval of phase A
AV=Vehicle (extendible) interval of phase A
AC=Clearance interval of phase A
A Rest=Rest position of phase A non-actuated
A Hold=Hold position of phase A actuated
AWK=Phase A walk interval
BI=Initial interval of phase B
BV=Vehicle (extendible) interval of phase B
BC=Clearance interval of phase B
B Hold=Hold position of phase B actuated
BWK=Phase B walk interval
FF=Bistable flip-flop serving as memory
AT=Normal interval time capacitor and trigger
ATS=Normal interval time selector of timing resistor, combination of AT+one selected timing resistance provides the RC constant for normal timing
BT=Maximum interval and safety time capacitor and trigger
BTS=Maximum interval and safety time selector of timing resistor, combination of BT+one selected timing resistance provides RC constant for safety and maximum limit timing
PT=Pedestrian interval time capacitor and trigger
PTS=Pedestrian interval time selector of timing resistor, combination of PT+one selected timing resistance provides RC constant for pedestrian walk and flashing walk timing
VSC=Vehicle 9 step switching circuit
PSC=Pedestrian 3 step switching circuit
DMV=Delay multivibrator
B HOLD=Hold position of phase B
STOP TIME=External hold operated It will be appreciated that the cycle of such control devices as presented in FIG. 7 may be partitioned into intervals and, as described relative to the control systems of FIGS. 1 and 4 the individual interval may occur in a sequential pattern of the sequential outputs or positions of the vehicle switching circuit (VSC) and/or the pedestrian switching circuit (PSC). In certain of the controllers, for example, Type 5, the full actuated two phase controller with actuated pedestrian phase associated with each vehicle phase, the intervals comprising the phase A part of the cycle are similar to the intervals comprising the phase B part of the cycle except that the phase A intervals provide right-of-way for phase A traffic while right-of-way is withdrawn from phase B and the phase B intervals provide right-of-way for phase B traffic while right-of-way is withdrawn from phase A.

During the phase A vehicle right-of-way intervals, the phase A pedestrian right-of-way intervals may be provided while during the phase B vehicle right-of-way intervals, the phase B pedestrian right-of-way intervals may be provided.

In the field of traffic control an accepted sequence of the intervals of a cycle for a traffic signal controller, such as Type 5, for example, an an example of the preferred sequence of intervals is a cycle which may be:

*Position 8.*—Phase A initial (AI) + or − phase A ped. walk (AWK position 12) phase A ped. clearance (position 13)
*Position 9.*—Skip (rest in semiactuated type)
*Position 1.*—Phase A vehicle (AV)
*Position 2.*—Phase A vehicle clearance (AC)
*Position 3.*—All red double clearance or phase B initial (BI)
*Position 4.*—Phase B initial (BI) + or − phase B ped. walk (BWK position 12) phase B ped. clearance (position 13)
*Position 5.*—Phase B vehicle (BV)
*Position 6.*—Phase B clearance (BC)
*Position 7.*—All red double clearance or phase A initial (AI)

It will be appreciated that the control systems represented in FIG. 1 and in FIG. 4 include controllers of Type 2 with the controller of FIG. 1 employing an eight position cyclic switching circuit and the controller of FIG. 4 employing a nine position cyclic switching circuit.

In the cycle of the controller of FIG. 1, position 8 serves as a phase A vehicle minimum green position while position 1 serves as a rest or skip position. It will be noted that there is no pedestrian walk signal associated with the phase A vehicle part of the cycle.

In the cycle of the controller of FIG. 4 position 8 serves as a phase A vehicle minimum green position while position 9 serves as a rest or skip position. Since pedestrian ROW signals are associated with the phase A vehicle part of the cycle and are timed by the vehicle timing circuitry a pedestrian clearance must be provided and while such clearance is provided the phase A vehicle traffic is given additional green time, such pedestrian clearance and additional phase A vehicle green period occuring in position 2.

It should be understood that where less than nine positions of a cycle may suffice for a full traffic signal cycle of any one controller any unused positions may be skipped or absorbed as a skip step so that a single interval may therefore actually include more than one position of the cyclic switching circuit.

Referring generally to the various components, the switches A VEH RECALL and B VEH RECALL represent recall switches for A vehicle phase and B vehicle phase respectively which may be closed to provide recall of the respective actuated phase, such recall being effective only during the AC and BC intervals respectively. The A MAX RECALL terminal and the B MAX RECALL terminal are assumed connected to the A MAX RECALL output and the B MAX RECALL output respectively; the input terminals labeled AC, BI, BV, AI, AV, BC, AWK and BWK are individually provided with an input signal during the respective intervals of phase A clearance, phase B initial, phase B vehicle, phase A initial, phase A vehicle, phase B clearance, phase A walk and phase B walk, respectively.

The logic diagram includes OR gates, each having the same symbol, of which several, but not all, are labeled for positive identification of all the OR gates; AND gates, each having the same symbol, of which several, but not all, are labeled for positive identification, of all the AND gates and, INHIBIT gates, each having the same symbol, of which one is labeled for positive identification of all the INHIBIT gates.

Each of the blocks DMV may be electrically similar to the delay multivibrator described and illustrated with reference to FIG. 6 while the blocks AT and ATS, and BT and BTS may be electrically similar to the normal time circuit and its associated reset and the safety and maximum time circuit and its associated reset, respectively.

The blocks ST and VSC may be electrically similar to the trigger circuit ST and the vehicle switching circuit VSC illustrated in circuit form in FIG. 5.

The block PSC representing the pedestrian switching circuit and the blocks PT and PTS representing the pedestrian timing and reset circuits may be similar to the comparable components described relative to FIG. 4 and FIG. 6.

The blocks FF may represent a form of flip-flop and may be similar to the block 104 represented in FIG. 1 and illustrated in FIG. 3 serving to provide memory of a call, indication of a call, indication of no call and, capable of being reset to a no call condition from a call condition by application of a signal provided in one or another position of the switching circuit during which the interval indicated occurs.

It will be appreciated that with all switches S1 through S24 in position *a*, all functions for providing a full actuated two phase traffic signal controller with an actuated pedestrian phase associated with each vehicle phase are provided. With all switches S1 through S24 in position *b* the functions for providing the actuated pedestrian phases are bypassed or electrically eliminated and the functions for providing phase A upon vehicle call have also been bypassed or electrically eliminated. Also, control over the timing, including reset by circuitry performing the functions for providing the actuated pedestrian phases and actuated vehicle phase A are also bypassed or electrically eliminated, along with elimination of the pedestrian time and reset circuitry and the pedestrian switching circuit.

It will be appreciated that the blocks of FIG. 7 representing the timing functions, as for example, the combinations of AT and ATS, BT and BTS and PT and PTS, may be similar to the timing and reset circuitry described relative to FIGS. 4 and 6 while the representation of a delay multivibrator, DMV, may be similar to that illustrated in FIG. 6 and the described relative to FIGS. 4 and 6. The switching circuitry, VSC, for the vehicle section and the PSC, for the pedestrian section may be similar to that described relative to FIGS. 4 and 5.

In the Type 3, 4 and 5, each of which are of the full actuated type controller, inputs A HOLD and B HOLD appear. Returning to FIG. 6, the circuit including lead 491 extending to the base of transistor 477 is circuitry for providing the A HOLD input, such as shown functionally in FIG. 7. In the full actuated form, position 9 would be the phase A extendible vehicle interval AV and input 488 would compare with the A HOLD. The input 486 would compare with NO B CALL IN AV and input 487 would compare with NO B PED CALL. In such full actuated form the circuitry in broken line block 256 would be duplicated and an input corresponding to position 9 would be labeled position 4, comparing to BV, the input corresponding to 488 would compare with the B HOLD, input corresponding to 486 would compare with NO A CALL IN BV and the input corresponding to 487 would compare with NO A PED CALL.

With such additional circuitry the controller may hold in the position 9 if there is no vehicle call and no ped. call for phase B or the external hold (A HOLD) is operated and may hold in position 4 if there is no vehicle call and no pedestrian call for phase A or if the external hold (B HOLD) is operated.

FIG. 7 has a feature that has heretofore been omitted from other forms of controllers and/or control systems herein. This added feature is the provision of the switch OPEN FOR MAX (maximum) EXT (extension). Opening of this switch, as illustrated, will provide reset of the maximum time capacitor (CAP B of FIG. 4) at the beginning of the extendible vehicle interval of phase B (BV) with switch S10 in its position *b* or at the beginning of the extendible vehicle interval of both phase B and phase A (BV and AV) with switch S10 in its position *a*, as illustrated in FIG. 7. This provides for separate timing, by the maximum timer, of the initial interval and the vehicle extendible interval.

With the OPEN FOR MAX EXT switch closed, passage of the reset pulse at the beginning of AV and BV for reset of the maximum limit time circuit is inhibited, as indicated by AV and BV signals via 739 to 709.

It will be observed that manual advance as by MANUAL in FIG. 7 compares more closely to the manual advance of FIG. 1 rather than FIG. 4; however, the type manual control found in FIG. 4 could be employed in FIG. 7 if desired.

It will be obvious to those skilled in the art that the representations of vehicle detectors, which appear throughout the various figures would be located in, on, over or under the roadway or roadways serving the vehicle traffic with which such detector is associated while the pedestrian push buttons (A PED and B PED) would be located at a point of convenient access for pedestrians who may desire to push the same, thereby serving to provide a pedestrian call.

Although the various forms of traffic signal controllers presented herein have included means for providing vehicle extension of the ROW period on the actuated phase between minimum and maximum limits in response to successive traffic actuations during such ROW period, and employing two timing units, for such extension timing and such maximum limit timing, as well as for regular and reserve timing for other intervals, it will be appreciated that, for some situations where such extension is not desired, the controller may be simplified by omitting or disconnecting the second timer, as for example, 107 in FIG. 3, serving as the maximum limit timer, or reserve or safety timer and omitting or disconnecting the vehicle extension reset circuit 163, as for example in FIG. 3. Elimination of the Max Time Circuit 107 would also eliminate the timing capacitor reset circuit controlled by transistor 219, for example in FIG. 3.

Elimination of the traffic actuated vehicle extension reset of timing capacitor 161, for example, may be accomplished by disconnecting the reset circuitry network in 163 from junction 164'.

Thus in such alternate form of simplified controller, the cycle of operation would be initiated by traffic actuation (vehicle or pedestrian) from the potential rest position in the main street ROW as described above, but the cycle of operation then would continue with the traffic actuated cross street or minor roadway having an adjustable preset period which might comprise the initial interval and a non-extendible vehicle interval, or these two successive time intervals might be replaced with a single time interval by eliminating the second such interval and corresponding step, 5 for example, in FIG. 1 in the cycle, thus reducing the switching circuit cycle by one step. This may be accomplished by using a switching circuit having one less step or by having the output of the trigger, 132, for example, applied to an AND gate, such as 169, for example, along with the output of the cyclic switching circuit in position 4 and thereby operate a reset to position 6, circuit, such as 167 through 170, for example, thereby skipping the intervening position 5.

A further alternate form for providing a nonactuated or fixed time traffic signal controller would be to further simplify the controller by eliminating, for example, the vehicle detector 102, the memory 104 and the circuitry to the left of junction 117 illustrated in FIG. 3. The AND gate 119 would be controlled by the External Hold input 118 and the input in position 1 with the hold circuitry from junction 117 removed. This would eliminate the position 1 rest-hold and the position 1 would become a coordination hold position.

In addition, the pedestrian section of the controller may be eliminated from the preferred form as well as from the alternate forms by disconnecting and/or removing the circuitry connected via lead 115 to junction 110 in FIG. 3 and eliminating the Ped Hold circuit 131 and the pedestrian ROW signal control circuits and signals.

Relative to FIG. 7 and the chart of switch positions, it will be appreciated that while mention was made that the switches were individually operable, two or more switches, having a common sequence of positions for providing the various types of controllers may be "piled-up" so that two or more switches may be positioned at one time.

For example, switch S1 is positioned in its positions *b*, *a*, *a*, *a*, and *a* according to which type of controller is provided, Type 1, 2, 3, 4 or 5 respectively. The switches S2 through S5, S7, S8, S10, S13, S15, S18 and S21 are positioned in their respective positions of *b*, *b*, *a*, *a* and *a* according to which type of controller Type 1, 2, 3, 4 or 5 respectively is provided. Thus the last mentioned group of switches may be ganged together so as to reduce the number of individually operated switches. Likewise the switches S6, S9, S14 and S20 may be ganged since these switches are positioned in their respective positions *b*, *a*, *b*, *a* and *a* according to the type of controller 1, 2, 3, 4 or 5 provided, respectively. The switches S11, S12, S16, S22, S23 and S24 may be ganged since these switches are positioned in their respective positions *b*, *b*, *b*, *b* and *a* and the remaining switches S17 and S19 may be ganged since both are positioned respectively to *b*, *b*, *b*, *a* and *a*, according to the type of controller 1 through 5 provided, respectively.

Thus in lieu of having 24 individually operated switches, the number of individually operated switches may be reduced to five for switching from one type of controller to any other of the remaining four types.

It will be appreciated that the switches add or eliminate circuit functions for providing one or another of the type of controller desired. Such switches may be in the form of jumper connections, if desired. Such jumpers may be made in printed circuit form and included on boards containing electronic circuitry to provide certain desired controller functions or take the form of jumpers on a printed circuit board without the electronic circuitry where those controller functions are not desired. Thus controller functions may be added or eliminated by substitution of one printed circuit board for another.

In this fashion a controller may be made in which the common functions, as for example, the timing function, the switching function and signal circuits are controlled by logic circuitry mounted on one or more printed circuit boards with certain of the printed circuit boards or a part thereof serving as jumper connections and replaceable with other printed circuit boards which include functional circuitry to be added to the controller, thus changing the type of controller from Type 1, for example, to Type 2, or any other type mentioned.

*Type 1 controller (semiactuated without pedestrian-actuated phase)—FIG. 7*

Referring to FIG. 7, the logic diagram of the family of solid-state controllers, with relation to the switch positions chart, it will be observed that with all the switches S1 through S24 inclusive, adjusted or set to their respective positions *b*, (all switches S1 through S24 are illustrated adjusted to their position *a*) a Type 1, semiactuated two phase controller, without actuated pedestrian phases may be provided.

Such switch settings provide for vehicle actuated functions on one phase or roadway of two intersecting phases or roadways, for example. To simplify the description one phase of the controller is herein referred to as B and provides control of traffic control signals for control of right-of-way on one roadway, such as Street B, for example, and the other phase of the controller is here referred to as A and provides control of traffic control signals for control of right-of-way on the other roadway, such as Street A, for example.

In the more complex form, as described below, B PED refers to pedestrian traffic desiring to cross Street A, for example and A PED refers to pedestrian traffic desiring to cross Street B. It will be seen that the B pedestrian right-of-way is provided during part of the vehicle phase B right-of-way period and the A pedestrian right-of-way is provided during part of the vehicle phase A right-of-way period.

The outputs of the electronic stepping switches VSC which may be similar to 263 in FIG. 4 and PSC, which may be similar to 262 in FIG. 4, and the combination of certain of their respective outputs, are represented in logic form in FIG. 9 where, the functional logic circuitry for providing power to the traffic signal circuits and traffic signals is provided, for each controller of the family of solid-state controllers represented in FIG. 7. It will be obvious to those skilled in the art that the functional logic circuitry for providing power to the traffic signal circuits and traffic signals in FIG. 4 may be employed in a Type 2 controller, if desired thereby providing a Type 2 controller with a nonactuated pedestrian phase associated with the nonactuated vehicle phase.

It should be understood that the following description includes the term "signal" or "signals," which are assumed to be electrical signals, such as an applied voltage or pulse. In accordance with our invention the character of the signal applied to the various gates may be determined by its origin. The character of the signals applied to a gate may determine the internal circuitry of the gate. The internal circuitry of some gate may determine the character of its output signal.

For example, an AND gate may provide an output signal or "pass" a signal of a desired character upon application of a predetermined combination of applied signals. Such predetermined combination of applied signals may be all positive voltages or signals, all negative voltages or signals or all ground signals or any combination of two or more such signals. Application of a signal to any gate refers to application of a signal of that character to which the gate will respond, as desired. Removal of a signal from any gate refers to removal of the applied signal or change of character of the applied signal from that character to which the gate is designed to respond.

Although we have described the following logic diagram with reference to OR gate, AND gates, INHIBIT gates and the combination of AND and INHIBIT gates, certain of the gates may include a signal inverting function such that applied signals of the same character may cause response of the gate so as to provide an output of a different character.

With the switches S1 through S24 inclusive, arranged to provide a Type 1 controller, (all switches in their position b) the B vehicle memory circuit, box FF, 701, may be driven to a "call," or vehicle memory, or "on" condition by a signal in response to closure of the vehicle detector B DET or by a signal through the B MAX RECALL terminal (from the B MAX RECALL output) or by a signal applied during the interval BC, vehicle clearance interval of phase B, if the switch B VEH RECALL is closed during such interval. Memory circuit 701 may be reset from a call to no call condition by a signal through the terminal, BV RESET, during the interval BV, the extendible vehicle interval of phase B.

With memory 701 in a no call condition, a signal, represented by NO B CALL, is applied through switch S1 position b, and OR gate 702 to AND gate 703. OR gate 702 may also pass a signal represented by A HOLD, which may be a manual, externally applied signal or may be an externally applied coordination signal used to coordinate two or more controllers in a control system. The signal from 702 will pass through AND gate 703 when the controller is in the A REST interval (the rest position of the non-actuated A phase). This provides for passage of a HOLD signal through AND gate 703 if there is no B call or if there is an A HOLD signal present *and* the controller is in the A REST interval or position.

The HOLD signal, when passed through 703, passes through S8 position b to INHIBIT gate 704. Such HOLD signal, when applied to INHIBIT gate 704, blocks or inhibits passage of any signal through 704.

Assume now that there is no signal applied through the A HOLD input terminal but there is a NO B CALL signal *and* the controller is in A REST interval. (A REST interval is a certain position of stepping switch VSC which may be a skip or rapid stepping position or may be a hold or rest position depending on whether or not the inhibit gate 704 is conditioned to pass a signal or is inhibited from passing a signal, respectively.)

Assume also that a vehicle in Street B now causes closure of the detector, B DET assumed located in, on, over or under Street B. Upon closure of the detector B DET, a signal is applied to vehicle memory 701 which drives such memory from a no call condition to a call condition. The signal NO B CALL is thus removed (by memory 701 being in a call condition) from OR gate 702 and from AND gate 703, thus the output signal from AND gate 703 (HOLD) is blocked so that the HOLD signal to INHIBIT gate 704 no longer appears. Gate 704 now is permitted to pass signals that may appear at its input. Thus it will be seen how the resting of the controller in the A REST position of the stepping switch VSC may be provided and overcome, and that the Type 1 controller will come to rest in the A REST interval and only under the conditions described.

Timing of the various intervals of the cycle is provided by the normal interval timing circuit AT/ATS and the maximum and safety timing circuit BT/BTS. The box AT provides an output signal at the completion of each interval timed by AT/ATS and such AT time signal is applied to AND gate 705. With switch S6 in position b, the "and" function of 705 is eliminated or bypassed, and time termination signal from AT applied to 705 will be passed to OR gate 706. The box BT provides an output signal (which may be similar in character to the time termination signal output of AT) at the completion of each interval timed by BT/BTS, and such BT time signal is also applied to OR gate 706. OR gate 706 will pass either, and/or both the AT time signal *or* the BT time signal to INHIBIT gate 704.

The signal passed by gate 704 is applied to OR gate 707 to the base ST, which represents a trigger circuit, such as ST in FIG. 5.

The trigger ST serves to provide a uniform signal output to the delay multivibrator DMV and to the electronic stepping switch VSC regardless of where its input signal originates (either from AT, BT or MANUAL, described below). The output signal of ST operates DMV which, in turn, provides an extended output signal which functions as a reset signal for both timing circuits. The leading edge of the output signal of ST serves to advance the electronic stepping switch VSC to its next position in the cycle, either by operating a trigger circuit in VSC or if there is no trigger circuit in VSC, by stepping the counter type stepping switch circuit.

To provide reset of the timing element of AT/ATS (assumed located in AT), the DMV output signal is applied to OR gate 708 which provides a reset signal to AT. OR gate 708 may also provide a signal in response to a signal applied via input terminal STOP TIME, which may be an external control, for resetting the timing element of AT and for stopping the timing of AT/ATS, so long as the STOP TIME signal is maintained. To provide reset of the timing element of BT/

BTS (assumed located in BT), the output of DMV is applied through INHIBIT gate 709 (now unblocked) to OR gate 710. OR gate 710 provides a reset signal to BT. OR gate 710 may also pass a signal in response to a signal applied via input terminal STOP TIME, which may be an external control, for resetting the timing element of BT and for stopping the timing of BT/BTS, so long as the STOP TIME signal is maintained. Thus the normal reset of the timing circuits AT/ATS and BT/BTS is provided for, as well as a reset and stop time feature, for each timing circuit.

At termination of each interval, both timing circuits may reset as described. In a controller of Type 1, the AT/ATS timing circuit is adjusted so as to normally terminate all the intervals, except the interval BV, in the cycle. In all positions or intervals except BV (and in the combined intervals of BI+BV, as described below) the BT/BTS timing is adjusted to serve as a safety timing circuit.

In interval or position BV, memory 701 is reset from a call condition to a no call condition, since normally to drive the controller out of A REST, a call condition of 701 is required (so as to remove the HOLD from 704).

To provide for manual cycling of the controller, out of any position or condition an input MANUAL is provided for providing a signal to OR gate 707 which gate will provide a signal to operate ST when such MANUAL signal is applied, as desired.

During the interval BV the timing circuit BT/BTS is normally adjusted to serve as the maximum limit timer (to time the maximum time that the controller may remain in the BV interval), and the timing circuit AT/ATS is arranged so that a vehicle actuation of the detector B DET, during such BV interval, may reset the AT timing element prior to termination of the interval timed by AT/ATS. This is normally referred as the vehicle extension feature, found in most traffic actuated controllers. Reset of the AT timing element may be made upon closure of the detector B DET thereby applying a signal to AND gate 711, which, during the BV interval, provides an output signal to OR gate 708, which, in turn provides a reset signal to reset the timing element of AT. Upon removal of the signal at AND gate 711, as by reopening of the detector contacts, AT/ATS may begin timing the interval over again. If AT/ATS completes a time period during the BV interval, prior to termination of the maximum limit time, the output of AT may cause termination of the BV interval by operating the trigger circuit ST, as described.

In the event that the timing element of AT is reset so as to extend the time of the BV interval so that the maximum limit time expires, timing circuit BT/BTS will operate to terminate the interval. If BT should provide its output in any interval, its output signal is applied to INHIBIT gate 712. Gate 712 is a combination AND gate and INHIBIT gate with switch S18 in its position *b* the inhibit function is eliminated and gate 712 serves only an AND function, passing an input signal only in BI or BV intervals as indicated by the OR gate 713. Thus, during BI or BV intervals, 712 may pass the output of BT to OR gate 714. The signal from 714 is applied to the B MAX RECALL output (assumed connected to the B MAX RECALL terminal in the lower left) to provide for recall of the B phase of the cycle and, the signal from 714 is also applied to the stepping switch VSC, through the line SET TO BC, which drives the stepping switch VSC from any position it may be in to the BC (phase B clearance) interval. To avoid hang-up in the BI (phase B initial) interval, OR gate 713 may also provide an output from BT to gate 712 during BI interval. Thus if AT/ATS fails to function to terminate the BI interval BT/BTS will operate to terminate the BI interval and bypass the BV interval by driving VSC directly from BI interval to BC interval.

It should be clearly understood that each interval is particularly associated with one or more positions of the electronic stepping switch, as for example, the BI interval is associated with one position of the stepping switch VSC, the BV interval is associated with the next position in progressive order of positions and the BC interval is associated with the next position, etc. Thus if the BT/BTS timing circuit operates to terminate the BI interval and drives the stepping switch VSC into the BC interval, from the BI interval, the BV interval is essentially skipped by the stepping switch BSC being driven from the BI interval into the BC interval, through the SET TO BC circuit.

This feature brings out one of the advantages of an electronic stepping switch, that is, that such type stepping switch may be advanced in discrete steps, on a step-by-step basis by normal pulsing of the electronic stepping switch or may be driven to any predetermined position by driving the digital circuits of the stepping switch into a predetermined condition in the cycle of operation of the controller.

It should also be understood that in absence of a HOLD signal applied to INHIBIT 704 each successive interval, is timed (except for the intervals which are essentially skipped and these skipped intervals may be considered to have very short period timing), and the advance of the stepping switch VSC, reset of the timing circuit and the timing of the following interval is an automatic and continuing process. Thus it will be seen that the normal timing circuit operates to time the "current" interval and provides a signal at the end of such timed period to cause advance of the stepping switch and reset of the timing circuits so that the next interval may be timed. This cyclic process continues unless there is an absence of a B call, in the A REST position. In absence of a B call, termination of the interval is prevented by presence of the HOLD signal at 704 so as to prevent advance of the stepping switch VSC to the next position by inhibiting passage of the time termination signal. Such inhibit action also prevents reset of the timing circuits.

Thus it is believed that a controller of Type 1 has been functionally described.

*Type 2 controller (Semiactuated with actuated pedestrian phase)—FIG. 7*

In order to add actuated pedestrian functions to the Type 1 controller and thus convert the controller into a Type 2 controller (reference may be had to the switch positions chart for providing the positions of the various switches S1 through S24 inclusive), the pedestrian memory circuit, box FF, 720, is added to the circuitry by positioning switches S1 to *a*, S14 to *a*, and S15, S16 and S17 remaining in *b*, for including a signal representing NO B PED CALL as contributing to provide the NO B CALL signal to 702. The positions of switches S1, S14 and S15 insert the function of AND gate 721 so that 721 will provide a signal output if there is no B vehicle call *and* NO B PED call. Switches S19 and S24 remain in *b*, and S9 is positioned to *a*, so as to add the functions of the pedestrian stepping switch PSC, the pedestrian timing circuit PT/PTS and pedestrian timing reset circuit to the controller.

The pedestrian memory, 720, may be driven from a no call condition to a call condition by a signal provided by closure of the pedestrian push-button, B PED *or* by closure of the recall switch B PED RECALL and may be reset from a call condition to a no call condition by a signal view switch S17 position *b* (bypassing AND gate 748), during the interval BWK (B pedestrian walk position of the stepping switch PSC). In addition, memory 720 also provides a B PED CALL signal via lead 722 when the memory circuit is in a call condition.

AND gate 721 provides that a NO B CALL signal is a combination of NO B VEH CALL *and* NO B PED CALL signals. Thus it will be seen that a pedestrian call may eliminate the NO B CALL signal output of 721, and thereby may call for the B vehicle phase. The B PED CALL signal via lead 722, is applied to AND gate 723. AND gate 723 functions to ensure that the pedestrian stepping switch PSC will be driven from a rest or no walk condition upon application of the reset pulse from the vehicle section DMV via switch S9 *and* the stepping switch VSC being in its position BI *and* the pedestrian memory 720 being in a call condition, all three conditions occurring at the beginning of the BI interval. To provide the BWK interval (B WALK), PSC is driven out of its rest (B WAIT) position, 11, to position 12 via a signal from AND gate 723 via S19 position *b*. In position 12, the pedestrian walk interval (BWK) is timed by the pedestrian timing circuit PT/PTS. At the end of the timed period, PT provides a time terminating pulse to trigger ST which provides a pulse to advance the stepping switch PSC to its next position, 13 and also provides a pulse to delay multivibrator, DMV which provides a signal to OR gate 724 which passes such signal, as a reset signal, to reset the timing element in PT. The pedestrian clearance interval (BW/F) is timed by PT/PTS in position 13, and subsequently terminated as described above, advancing PSC to its rest position. To insure that the pedestrian right-of-way intervals of walk and clearance occur during the interval BI, switch S6 is positioned to *a* and the *and* function of AND gate 705 prevents passage of the signal from AT to VSC so long as the stepping switch PSC is *out* of its PED REST position.

Thus, during the pedestrian right-of-way intervals, the AT/ATS timing circuit is prevented from terminating the BI interval. However, the BT/BTS timing circuit may terminate the BI interval if the timing circuit BT/BTS times out before the pedestrian stepping switch PSC is returned to PED REST position. For normal operation of the controller the timing circuit BT/BTS is adjusted so as to normally permit the pedestrian walk and clearance intervals to time out before termination of the interval timed by BT/BTS. If BT/BTS timing circuit should terminate the BI interval, the stepping switch VSC will be driven directly to the BC interval, as described and during such interval, a signal is applied via switch S20, now positioned to *b*, which drives the stepping switch PSC to rest via the SET TO REST lead.

The signal passing through AND gate 723 which drives PSC to its walk position is also applied through OR gate 724 to reset the timing element in PT STOP TIME input to 724 also serves to reset the timing element PT and prevent PT from timing so long as the STOP TIME signal is maintained.

*Type 3 controller (full-actuated without actuated pedestrian phase)—FIG. 7*

To convert the controller into Type 3, two-phase full actuated, without pedestrian phase, reference may be made to the switch positions chart from the complete switch settings. Switch S14 in position *b* eliminates any signal from memory 720, so as to functionally eliminate the pedestrian functions. Switch S16 in *b* bypasses OR gate 741 and insures that AND gates 721 will pass a NO B CALL signal when there is NO B VEH CALL *and* the controller is in the AV interval. This function holds the controller in AV so long as there is no demand or call for right-of-way by B vehicle traffic. The switches S23 and S22 will be positioned in *b* and switch S5 will be positioned in *a* so as to functionally add the phase A vehicle actuated functions of NO A CALL, A VEH CALL and vehicle reset to the controller. The A memory circuit, box FF, 730, is similar to the B memory circuit 701 in that the circuit may be driven from a no call condition to a call condition by closure of its associated vehicle detector and may be reset from a call to a no call condition, except that reset is provided during AV interval. Closure of the A vehicle detector A DET will provided an A VEH CALL signal to change 730 from a no call to a call condition in all intervals except AV. Recall, through closed switch A VEH RECALL, may be provided during the AC interval. Switches S7 and S8 are both positioned in *a*. Switch S7 applies a signal to AND gate 703 so that a HOLD signal from 702 will pass through AND gate 703 only during AV. Switch S8 applies such HOLD signal to OR gate 731 which passes a signal only during AI or AV intervals, as indisignal from AND gate 732 resulting from a no call condition in memory 730 *and* the controller is in BV interval, as indicated by AND gate 734. The NO A CALL signal is applied to OR gate 733 and, OR gate 710 via switch S2 position *a*. AND gate 734 insures that the NO A CALL signal or B HOLD signal via 733 will pass only during BV interval so as to hold the controller in the BV interval when there is no call or demand for right-of-way by A traffic. The NO A CALL signal through OR gate 710 resets and holds the timing element in BT. Reset of the timing element in AT for the extendible interval of phase A is provided for during AV interval by AND gate 735 when the vehicle detector A DET is closed by vehicle actuation.

Termination of the AI or AV interval by operation of the timing circuit BT/BTS operates to reset the timing circuits through ST and DMV as described, while the output of BT is also applied through switch S3, position *a*, to the combination AND and INHIBIT gate 736, which passes a signal only during AI or AV intervals, as indicated by the output of OR gate 737 to 736. Application of a signal from A HOLD to gate 736 will prevent passage of such signal until A HOLD is released. Note that switch S18 would be positioned to *a* so as to prevent passage of a signal from BT until the B HOLD signal is released from the combination AND and INHIBIT gate 712 during BI *or* BV, as indicated by OR gate 713. The signal from 736 will pass through OR gate 738 and switch S21 position *a* to be applied to the stepping switch VSC, to drive VSC to AC interval via SET TO AC lead and to provide for recall of the A phase via a signal at A MAX RECALL, assumed connected to a A MAX RECALL input in the upper left. The terminal A FORCE OFF, represents an input for an external signal for driving VSC to AC from any other position and provides for recall of phase A via A MAX RECALL. The terminal B FORCE OFF, through 714 and switch S4 position *a*, represents an input for an external signal for driving VSC to BC from any other position and for providing for recall of phase B via B MAX RECALL.

Thus the functions of a two phase full actuated controller, without actuated pedestrian phase may be provided for, in accordance with our invention.

It may be desired to employ the timer BT/BTS to time the entire green of a vehicle phase (period BI+BV or AI+AV) in one time interval or to time each interval of the vehicle green period separately in two steps or time intervals. With switch OPEN FOR MAX EXT in the position shown, reset at the end of the BI for example, the B vehicle intervals and AI for example, of the A vehicle intervals, is provided for by absence of an inhibit signal at 709. With switch OPEN FOR MAX EXT closed and switch S10 in *b* for Type 1 and Type 2 controllers, reset of the timing element of BT is prohibited between the BI and BV intervals since, as previously described reset of the timing element occurs at the beginning of the interval.

OR gate 739 and switch S10 provides that reset of the timing element BT may be prevented between BI and BV, and AI and AV, if desired.

Type 4 controller (full-actuated with one actuated pedestrian phase)—FIG. 7

To provide a controller of Type 4, a two phase, full actuated controller with actuated pedestrian phase associated with one phase, the actuated pedestrian features of the Type 2 are added to the Type 3 so as to convert the controller into the Type 4. Reference to the switch positions chart may be had for the various switch positions for such controller. The functions of the actuated pedestrian phase as provided in the Type 2 are added to the full actuated controller of Type 3. Such pedestrian functions are substantially similar to those described relative to FIGS. 1 and 4, and the Type 2 controller.

It should be pointed out that any one controller, having fewer functions than the Type 5 controller, may be made as an individual controller with only the functions required for such controller. Construction of such controller requiring fewer functions may omit certain AND function and/or OR functions where a switch is shown to so eliminate the OR and/or AND function: for example, switch S4, in its position *b* in a Type 1 controller, by-passes OR gate 714. Such Type 1 controller, made particularly to be only Type 1, without conversion features, may eliminate not only the OR gate 714 but also the switch S4, for example, so that the output of gate 712 is tied directly to the B MAX RECALL and SET TO BC leads.

With all the switches S1 through S24 inclusive, in their position *a*, as illustrated in FIG. 7 a Type 5 controller, two phase full actuated with an actuated pedestrian phase associated with each vehicle phase, is provided.

Switch S23, in position *a*, connects the A pedestrian memory circuit, 740, to the AND gate 732. The A memory, 740, is similar functionally to B memory, 720. An A pedestrian call or actuation, as by closure of the push-button A PED or, closure of the A PED RECALL switch may drive 740 from a no call to a call condition. Reset from a call to a no call condition occurs when the controller is in AI or AV interval, as by OR gate 746 *and* the pedestrian stepping switch is in its AWK (A WALK) condition or position as indicated by AND gate 742.

With switch S17 in position *a* reset of the memory 720 may occur in BI or BV as indicated by 747 *and* the pedestrian switch is in BWK as indicated by 748.

It should be understood that the pedestrian stepping switch PSC is a three position counter type stepping switch, similar to that described relative to FIG. 4. The stepping switch PSC normally rests in WAIT position 11, which is an untimed position. A signal via the SET WALK lead is employed to drive the stepping switch out of its rest position. Such driving signal may be provided via the output of AND gate 723, under the conditions already described, or via the outputs of AND gate 742, 744, or 745 under the conditions described below. Advance out of a pedestrian rest position or interval (here assumed position 11) into the next position or interval (here assumed position 12) provides a WALK interval that is timed by the timing circuit PT/PTS. Whether such WALK is AWK (A WALK) or BWK (B WALK) depends upon the vehicle phase (A or B) in which the vehicle stepping switch VSC is then in, as will be described below.

Type 5 controller (full-actuated with two actuated pedestrian phases)—FIG. 7

The Type 5 controller, most complex of the five types of controllers represented in FIG. 7 adds the actuated pedestrian phase features to the actuated A vehicle phase of the controller cycle to the features described relative to Type 4 controller. This provides an actuated A vehicle phase and an associated actuated A pedestrian phase, substantially similar to the actuated B vehicle phase and the associated actuated B pedestrian phase, described relative to Type 2 and Type 4 controllers. The A pedestrian phase is normally provided when the memory 740 is in a call condition so that a signal a PED CALL is applied to AND gate 745 *and* the reset pulse from the vehicle section DMV appears through switch S9, position *a* and S24, position *a and* the controller is in AI. Under these conditions AND gate 745 passes a signal to OR gate 743 to drive PSC out of its rest condition and to reset the timing element in PT via 724. The A pedestrian walk (AWK) is provided and timed when PSC is in position 12 with VSC in AI (or AV, see FIGS. 8 and 9) and the A pedestrian clearance (AW/F) is provided and timed when PSC is in position 13 and VSC is in AI (or AV, see FIGS. 8 and 9). However, this more complex controller provides that a NO B CALL signal is a combination of NO B PED CALL *and* NO B VEH CALL *and* the controller is in AI *or* AV intervals. This is provided by the functions of AND gate 721 with switches S1, S14, S15 and S16 in *a* and the function of OR gate 741. The NO B CALL signal from 721 is applied via switch S11 to AND gate 742 shown as NO B CALL IN AV (+AI). (With switch S16 in *b* OR gate 741 is bypassed so that the NO B CALL signal from 721 would be a NO B CALL IN AV signal.) With the signal NO B CALL from 721 *and* a signal A PED CALL both applied to AND gate 742 a signal from 742 will be applied to OR gate 743 to drive the pedestrian stepping switch PSC out of its rest position so as to accord right-of-way to A pedestrian traffic at a time in the cycle other than at the beginning of the AI interval. The OR gate 746 provides for reset of memory 740 during the AI *or* AV interval *and* the PSC is in AWK, as shown by OR gate 746 and AND gate 742. These functions provide that the A pedestrian right-of-way intervals may be repeated (PSC recycled) so long as the controller remains in AV interval, *and* the signal NO B CALL IN AV is applied to AND gate 742 *and* the signal A PED CALL is applied to 742.

Relative to the B pedestrian phase, the signal NO A CALL from 732 is applied to AND gate 744 as NO A CALL IN BV (+BI) signal. With a NO A CALL signal from 732 *and* a signal B PED CALL both applied to 744, a signal from 744 will be applied to OR gate 743 to drive PSC out of its rest position so as to cycle or recycle the pedestrian stepping switch so as to accord right-of-way to B pedestrian traffic at a time in the cycle other than at the beginning of BI interval. The NO A CALL signal, from AND gate 732 may be provided in the BI or the BV interval as indicated by the OR gate feeding through S22 position *a* so long as there is no A vehicle call *and* no A pedestrian call in such intervals. The signal NO A CALL is applied to OR gate 733 and to OR gate 710. With the signal from 733 *and* the signal BV applied to AND gate 734, and output signal from 731 passes as a HOLD signal to INHIBIT gate 704 to inhibit or hold any signal which may appear at 704 via 706 from AT or BT. The NO A CALL signal applied to OR gate 710 provides for reset of the timing element in BT and holds such timing element from timing. Thus when the NO A CALL signal is removed, as by an A vehicle call or by an A pedestrian call, the timing element BT then starts to time the maximum limit time that the controller may now remain in BV.

It will be appreciated that when the controller cycles from the phase B intervals into the phase A intervals and there is both an A vehicle call and an A pedestrian call or there is only an A pedestrian call, the A PED/ CALL signal from memory, 740, will be applied to AND gate 745 and provide the phase A pedestrian signals of walk (AWK) and clearance (AW/F). This operation is similar to that described relative to the phase B pedestrian except, that the AND gate 745 responds to phase A signals while AND gate 723 responds to phase B signals.

It should be understood that the outputs of the stepping switch, VSC 1 through 9, are connected through appropriate logic circuitry to the traffic signal circuit so as to illuminate the desired traffic signal combination to vehicle traffic. Further, the outputs 11, 12 and 13 of the stepping switch PSC are combined through logic circuitry with certain of the outputs of VSC so as to provide the desired pedestrain traffic signals.

The outputs (12 and 13) of PSC determine the pedestrian right-of-way intervals of walk and clearance respectively and the output of the VSC determines the phase, A or B of the controller. Since the outputs of PSC determine the pedestrian right-of-way interval and the outputs of VSC determine the phase to which such pedestrian right-of-way interval is to be allocated then it may be said that the positions of PSC are common to both phases for providing pedestrian right-of-way. In a Type 5 controller the common positions 12 and 13 of PSC are allocated to A pedestrian traffic or to B pedestrian traffic according to which vehicle phase, A or B, is then provided for by the output of the stepping switch VSC.

*Logic diagrams for control of traffic signals by VSC and PSC—FIG. 9*

FIG. 9 illustrates, in functional logic diagram form, how certain of the outputs of VSC and PSC may be combined to provide, AWK in the walk (12) position of PSC or BWK in the walk (12) position of PSC, and also how to provide AW/F (A Ped clearance) in the clearance (13) position of PSC or BW/F (B Ped clearance) in the clearance (13) position of PSC. Logic circuitry for providing a WAIT pedestrian signal is also shown for each pedestrian phase.

*Individual or common timing of pedestrian intervals— FIGS. 8 and 8a*

Reference may be made to FIG. 8 for illustrating, in logic form, one method of providing individually adjustable, timed intervals for each individual pedestrian right-of-way interval respectively and for distinguishing between the phases, A or B, in a Type 5 controller.

The use of one pedestrian stepping switch (PSC), serving both phases, in common, with both ped. phase A functions and ped. phase B functions individually capable of driving the common pedestrian stepping switch PSC out of its rest or wait position, so as to provide a pedestrian right-of-way phase for A or B pedestrian traffic respectively at a particular predetermined part of the cycle for each respective phase, brings out an additional feature of the Type 5 controller, over prior art. (Note the functions of AND gate 745 for phase A and AND gate 723 for phase B described above.)

Referring to FIG. 8, the diagram represents one method which may be employed to provide individually timed and individually adjustable pedestrian right-of-way intervals with separation of the respective phases A and B. Individually timed and individually adjustable intervals in the pedestrian right-of-way periods are preferred, however, FIG. 8a represents an alternate method of providing pedestrian right-of-way interval timing in which the walk and clearance periods are individually timed but are common to both phase A and phase B.

Relative to FIG. 8, it will be observed that the output positions 12 and 13 from the pedestrian stepping switch circuit PSC, are applied to logic form, block diagram circuitry, in a box 750, along with the output positions BI and BV for phases B and AI and AV for phase A of the stepping switch VSC. By the use of AND gates, distinction between phase A pedestrian right-of-way intervals and phase B pedestrian right-of-way intervals is made.

The box PTS, in FIG. 8 includes four adjustable timing resistors feeding into an OR gate and into the timing element, assumed included in block PT. Selection of one of the four timing resistors is made by the logic circuitry in box 750, in accordance with the output or position of the vehicle stepping switch VSC *and* the output or position of the pedestrian stepping switch PSC.

FIG. 8a shows a form of pedestrian interval timing in which distinction between the vehicle phases has been eliminated (box 750 has been eliminated).

The logic circuitry of FIG. 8a may be used, for example, in a Type 2 or Type 4 controller, where there is only one actuated pedestrian phase or may be used in a Type 5 controller where distinction between phase A pedestrian interval timing and phase B pedestrian interval timing may not be required. Thus FIG. 8a illustrates one form of providing pedestrian interval timing where there is an actuated pedestrian phase associated with only one vehicle phase or where both the phase A pedestrian intervals and the phase B pedestrian intervals have common timing.

*Further variations and relations of the several figures*

FIG. 9 represents circuitry in logic diagram form, which may be found in the block, LOGIC TO SIGNAL CIRCUITS, seen in FIG. 7, for supplying power to the traffic signal circuits.

The stepping switch circuits VSC and PSC in FIGS. 8, 8a and 9 correspond to the stepping switch circuits VSC and PSC in FIG. 7, displaced. In FIG. 9 the outputs 1 through 9 of VSC are illustrated as applied to a network of OR gates for providing power to the vehicle traffic signal circuits. The outputs in position BI (4) *or* BV (5) of VSC are combined through the use of AND gates with the outputs of 12 and 13 of PSC for providing power to the phase B pedestrian walk and phase B pedestrian clearance traffic signal circuits respectively, while positions AI (8) *or* AV (1) of VSC are combined through the use of AND gate with the outputs 12 and 13 of PSC for providing power to the phase A pedestrian walk and phase A pedestrian clearance traffic signals respectively.

The power for the pedestrian traffic signal AWT (A Wait or A Don't Walk) is provided during all positions or intervals of VSC except AI and AV (and the position 9, skip interval between AI and AV) *or* so long as the stepping switch PSC is in position 11.

Power for the pedestrian traffic signal BWT (B Wait or B Don't Walk) is provided during all positions or intervals of VSC except BI and BV *or* so long as PSC is in position 11.

By eliminating certain of the functions as indicated by legends in FIG. 9 power may be applied to the various signal circuits needed to control traffic, in accordance with the type of controller provided. Where any traffic signal may be eliminated the circuit supplying power to the signal circuit of the eliminated traffic signal may also be eliminated.

The vehicle traffic signal or lamp indications AG, AY, AR, BG, BY and BR correspond to the similarly labeled traffic signal indicators in FIG. 1 and FIG. 4.

Thus we have shown how FIG. 7 functionally describes five related controllers in a family of solid-state controllers, and how, in FIGS. 8 and 8a, the predestrian intervals may be distinguished, between the phases and timed, and how, in FIG. 9, power may be provided to the various signal circuits. Obviously non-actuated A pedestrian traffic signals may be provided in a Type 2 controller using signal circuitry as shown in FIG. 4. If it is desired to provide a controller in which the phase A is actuated and the phase B is non-actuated, such as functionally found in Type 1, the traffic signals normally displayed to phase B traffic would be displayed to phase A traffic and vice versa which is merely a change in positioning the traffic signals at the intersection, which is believed to be obvious. Also a Type 2 controller may be made with the phase A vehicle and predestrian sections both actuated and the phase B vehicle section non-actuated by transpositioning the traffic signals, as desired.

Obviously if a controller of Type 5 were to be constructed, the switches S1 through S24 and the alternate circuitry in position *b* of each switch would be eliminated. If any of the other type controllers other than Type 5 were to be constructed so that it was not convertible to any other type represented, or were convertible to fewer than the four other types, certain of the switches S1 through S24 could be eliminated along with the unused alternate circuitry or functions so long as the circuitry and functions eliminated were eliminated from all the controllers to which the complex controller could be converted.

It should be noted that although the electronic stepping switch circuit VSC has been referenced to, and may be similar to the stepping switch circuit represented in FIG. 4 and illustrated in FIG. 5, it may be desired to omit from the stepping switch circuit VSC of FIG. 7, the Schmidt (or Schmitt) trigger represented in FIG. 4 (block 263, ST) and illustrated in FIG. 5 (ST).

If the form of stepping switch as illustrated in FIG. 5 were employed as VSC in FIG. 7, then two series connected triggers would be used. In such alternate form, as by elimination of the trigger ST from the illustrated form stepping switch in FIG. 5, only one trigger, ST, would be used between OR gate 707 and the stepping switch counter circuit.

Such alternate form of stepping switch counter circuit may be used as the stepping switch PSC in FIG. 7, if desired.

It should be noted that consolidation of certain similar gates, which respond to identical signals and provide outputs of identical character may be possible, if desired. As for example the OR gates 741, 746 and 737 each respond to the same information or signals, during AI and AV and each gate may provide an output signal of the same character. It may be desired to provide one OR gate which will respond to signals during AI and AV, which may serve the same purpose of the three OR gates 741, 746 and 737 and, by a plurality of output leads, feed the output signal of the one OR gate to position of switch S16 to AND gate 742 and to INHIBIT gate 704 respectively, to thereby eliminate circuitry and yet provide the functions desired, for example.

Although a preferred form and several alternate forms of the invention have been described herein and certain preferred circuitry has been illustrated, it will be obvious to those skilled in the art that other alternate forms, such as combinations of two or more of the alternative forms may be made and other circuit arrangements including substitution and/or rearrangement of the parts and/or components may be made without department from the spirit of the invention within the scope of the claims.

We claim:

1. A traffic signal controller including
signal circuits,
electrical timing means providing an electrical output signal on completion of a time period and having plural time control circuits for setting different times for said time period,
a multistage electrical sequence switching circuit including
a cascaded series of electronic switching elements coupled to provide a cycle of steps and to be advanced step-by-step in response to input pulses,
means for coupling said multi-stage circuit to different ones of said time control circuits of said timing means in different steps of said cycle for providing individual timing in said different steps,
means for coupling said timing means to said multistage circuit to provide said input pulse from said output signal for so advancing said multistage circuit from one step to another in said cycle in response to completion of timing in said one step,
means for resetting said timing means upon such advance in so timing said steps and
means for coupling said multistage switching circuit to said signal circuits for controlling the latter in the several steps of such cycle.

2. A traffic signal controller as in claim 1 and including starting circuit means coupled to said multistage switching circuit to set said multistage switching circuit to a predetermined step of its cycle to start its cycle of operation.

3. A traffic signal controller as in claim 1 and including control circuit means coupled to said multistage switching circuit to apply successive input pulses thereto as desired for advancing said multistage switching circuit step-by-step through its cycle for control of said signal circuits.

4. A traffic signal controller as in claim 1 and
in which said timing means includes trigger circuit means for providing said input pulses for advancing said switching circuit and a resistance-capacitance timing circuit for controlling said trigger circuit coupled thereto to so provide said pulses,
said resistance-capacitance circuit having a plurality of resistances in respective said time control circuits,
and means controlled by said multistage switching circuit for coupling different of said resistances to said capacitance for so coupling said timing means for timing different steps of said cycle.

5. A traffic signal controller as in claim 1 and in which said multistage switching circuit includes a counting circuit of solid-state switching elements coupled to a solid-state gate matrix having individual output gates for the respective steps of said cycle,
and in which said controller includes solid-state OR gate logic circuitry for so coupling said multistage switching circuit to control said timing means and for so coupling said timing means to said multistage switching circuit for so timing the several steps for so controlling the advance of said counting and switching circuit.

6. A traffic actuated traffic signal controller including signal circuits,
an input circuit for coupling a traffic actuable device thereto,
electrical timing means,
a multistage electrical sequence switching circuit including a cascaded series of electronic switching elements coupled to provide a cycle of steps and adapted to be advanced step-by-step in response to input pulses,
said multistage circuit being coupled to said timing means to operate said timing means in different steps of the cycle for timing,
means for coupling said timing means to said multistage circuit to provide said input pulses for so advancing said multistage circuit in such cycle,
said coupling means being coupled to said input circuit to be controlled thereby for preventing said timing means from so advancing said multistage circuit in one step of said cycle in absence of traffic actuation of said input circuit and for permitting said timing means to so advance said multistage switching circuit from said one step in response to said traffic actuation.

7. A traffic signal controller as in claim 6, and
in which said timing means includes trigger circuit means for providing said input pulses for advancing said switching circuit and a resistance-capacitance timing circuit for controlling said trigger crcuit to so provide said pulses,
said resistance-capacitance circuit having a plurality of resistances,
and means controlled by said multistage switching circuit for coupling different of said resistances to said capacitance for so coupling said timing means for timing different steps of said cycle.

8. A traffic signal controller as in claim 6, and
in which said multistage switching circuit includes a counting circuit of solid-stage switching elements coupled to a solid-stage gate matrix having individual output gates for the respective steps of said cycle,
and in which said controller includes solid-state OR gate logic circuitry for so coupling said multi-stage switching circuit to control said timing means and for so coupling said timing means to said multistage switching circuit for so timing the several steps for so controlling the advance of said counting and switching circuit.

9. A traffic actuated traffic signal controller as in claim 6 and in which
said multistage switching circuit includes a counting circuit of solid-state switching elements coupled to a solid-state gate matrix having individual output gates for the respective steps of said cycle,
and in which said controller includes solid-state OR gate logic circuitry for so coupling said multistage switching circuit to control said timing means and for so coupling said timing means to said multistage switching circuit for so timing the several steps for so controlling the advance of said counting and switching circuit,
and including solid-state AND gate logic circuitry for so preventing said timing means from so advancing said multistage switching circuit from said one step in absence of traffic actuation.

10. A traffic actuated traffic signal controller as in claim 6 and in which said traffic actuated input circuit means includes separate input circuits for coupling of a vehicle actuable device and for coupling of a pedestrian actuable device respectively, and in which said controller also includes additional timing means and a second multistage electrical sequence switching circuit including a second cascaded series of electronic switching elements coupled to provide a sub-cycle of steps and adapted to be advanced step-by-step in response to input pulses,
signal circuits for control of pedestrian right-of-ways,
and means for coupling said additional timing means to the first mentioned multistage switching circuit and to said second multistage switching circuit to control the latter to provide a subcycle for control of said pedestrian signal circuits in connection with the cycle of control of said first mentioned signal circuits by said first mentioned multistage switching circuit.

11. A traffic actuated traffic signal controller as in claim 6 and in which said multistage switching circuit includes means operated in a part of said cycle for operating said signal circuits for according right-of-way in a further step of said cycle in response to such traffic actuation,
and means including solid-state AND gate and OR gate circuitry for resetting said timing means in said further step in response to traffic actuation of said input circuit in said further step,
and second timing means coupled to said multi-stage switching circuit to be operated thereby to provide an input pulse to advance said multistage switching circuit from said further step after a maximum time in event the first mentioned timing means is prevented from completing its timing by successive such reset.

12. A traffic actuated traffic signal controller as in claim 11 and in which said switching circuit includes means for providing said record of right-of-way and operation of said second timing means in two successive further steps including the first mentioned further step, whereby said maximum timing will continue through both of said further steps.

13. A traffic actuated traffic signal controller including
signal circuits,
a traffic actuable device,
an input circuit coupled to said traffic actuable device for providing electrical signals, in response to actuation of said traffic actuable device,
electrical timing means,
a multistage electrical sequence switching circuit including
a cascaded series of electronic switching elements coupled to provide a cycle of steps and to be advanced step-by-step in response to input pulses, said multistage circuit being coupled to said timing means to operate said timing means for timing in different steps of the cycle,
means for coupling said timing means to said multistage circuit for providing said input pulses for so advancing said multistage circuit in such cycle in response to such timing,
an inhibiting gate coupled to said input circuit and controlled by the electrical signals received therefrom, said inhibiting gate further coupled to said multistage circuit for preventing said timing means from so advancing said multistage circuit in absence of traffic actuation of said traffic actuable device,
and means for coupling said multistage switching circuit to said signal circuits to control the latter.

14. A traffic signal controller as in claim 13 and including
a second traffic actuable device,
a second input circuit coupled to said second traffic actuable device for providing second electrical signals in response to actuation of said second traffic actuable device and including
an AND gate interposed between said inhibiting gate and the first mentioned said input circuit, and coupled to said first mentioned input circuit and to said second input circuit for receiving electrical signals therefrom, and said AND gate coupled to said multistage circuit for preventing said timing means from so advancing said multistage circuit in absence of actuation of both the said traffic actuable device and the said second traffic actuable device.

15 A traffic actuated signal controller including
signal circuits,
a multistage electronic switching circuit coupled to be controlled step-by-step through phases of a traffic control cycle,
means for coupling said multistage electronic switching circuits to said signal circuits to control the latter,
a plurality of input circuits for coupling traffic actuable devices thereto,
electrical timing means coupled to said multistage electronic switching circuit to advance same at the end of predetermined periods,
an inhibiting gate for preventing said timing means from so advancing said multistage electronic switching circuit coupled to said timing means,
another gate interposed between said inhibiting gate and said input circuits and coupled to said inhibiting gate and to one of said input circuits for preventing operation of said inhibiting gate,
and gates controlled by said multistage electronic switching circuit for selecting the said input circuit to be coupled to said another gate for different positions of said multistage electronic switching circuit.

16. A traffic signal controller as in claim 15 and further including
a second multistage electronic switching circuit coupled to be advanced step-by-step through phases of a sub-cycle of said traffic control cycle,
means for coupling said second multistage electronic switching circuit to said signal circuits,
second timing means coupled to said second multistage electronic switching circuit to advance the same at the end of predetermined periods,
a control gate coupled to the first mentioned said electrical timing means and to said second multistage electronic switching circuit and to the first mentioned multistage switching circuit for preventing advance of the said first mentioned multistage electronic switching circuit during timing by said second timing means of certain of the steps of said second multistage switching circuit.

17. A traffic signal controller including signal circuits and electrical timing means,
- a multistage electrical sequence switching circuit including
- a cascaded series of electronic switching elements coupled to provide a cycle of steps and advanced step-by-step in response to input pulses,
- said multistage circuit being coupled to said timing means to actuate said timing means for timing in different steps of the cycle,
- means for delaying the start of timing by said timing means for a predetermined period after advance of said multistage circuit to a different step,
- means coupling said timing means to said multistage circuit to provide said input pulses for so advancing said multistage circuit from one step to another in said cycle on completion of timing in said one step,
- and means coupling said multistage switching circuit to said signal circuits to control the latter in such cycle.

18. A traffic signal controller as in claim 17 and in which said delay means includes a delay multivibrator.

19. A traffic actuated traffic signal controller including signal circuits,
- an input circuit for coupling a traffic actuable device thereto for providing electrical signals thereon in response to traffic actuation, said electrical signals having differing electrical characteristics in dependence upon actuation and nonactuation of said traffic actuable device,
- electrical timing means,
- a multistage electrical sequence switching circuit including
- a cascaded series of electronic switching elements coupled to provide a cycle of steps and coupled to be advanced step-by-step in response to input pulses,
- said multistage circuit being coupled to said timing means to operate said timing means in different steps of the cycle for timing,
- means for coupling said timing means to said multistage circuit to provide said input pulses for so advancing said multistage circuit in such cycle,
- an inhibiting gate coupled to said input circuit and controlled by electrical signals received from said input circuit for preventing said timing means from so advancing said multistage circuit in dependence on said differing characteristics of said electrical signals,
- and means coupling said multistage switching circuit to said signal circuits to control the latter.

20. A traffic signal controller for an intersection of plural traffic lanes and having traffic actuated means for actuation by traffic in at least one of said lanes,
- a plurality of groups of at least two transistors, each group of said plurality coupled as a digital counter having a common input-advance circuit and having interlinking circuit means for setting the respective transistors individually into one or another of two distinct alternate conditions with respect to conduction, one condition being relatively conducting and the other condition being relatively nonconducting, said interlinking circuit means including means for setting one transistor of said at least two transistors into said one condition and for setting the other transistors of said at least two transistors into said another condition in response to an input-advance pulse at said common input-advance circuit so as to operate the said at least two transistors sequentially, individually to said first condition.

21. A traffic signal controller for an intersection of plural traffic lanes and having traffic actuated means for actuation by traffic in at least one of said lanes
- a first group of three transistors coupled as a three-stage counter having a common count-advance input circuit and having interlinking circuit means for setting the respective transistors individually into one or another of two distinct alternate conditions with respect to conduction, one condition being relatively conducting and the other condition being relatively nonconducting,
- said interlinking circuit means including means for setting a different one of said transistors into a first of said alternate conditions and the other two transistors into a second alternate condition in response to a count-advance pulse at said input circuit to so operate the three transistors in sequence to said first condition in a counting ring,
- a second group of three transistors coupled as a similar three-stage counter and coupled to one of said first group of transistors to be advanced in count by each cycle of said first group as a multiplier thereof,
- means including gate circuits coupling the two groups of transistors to be advanced step-by-step by said count-advance pulses in unit steps through a cycle which is a predetermined multiple of three, to provide individual distinctive outputs for each unit step,
- a go signal circuit and a stop signal circuit and a clearance signal circuit individual to each of said intersecting lanes,
- means coupled to said gate circuits for energizing the signal circuits in particular steps in response to said output for providing a traffic signal cycle for control of said lanes,
- timing means controlled by said outputs from said coupling means in the respective steps for timing therein and for providing said input pulses to advance said multistage counter from step to step,
- and means coupled to said traffic actuated means to be controlled thereby, for holding said multistep counting circuit in one particular step of its cycle in absence of actuation of said traffic actuated means, and for advancing said counting circuit from said one step in response to such actuation.

22. A traffic signal controller as in claim 21 and in which said holding means includes
- a gate circuit for controlling said coupling means for so coupling said timing means to provide said advance input pulse in said one step in response to actuation of said traffic actuated means and to interrupt effectively said coupling in said one step in absence of actuation of said traffic actuated means,
- at least another group of at least two transistors connected as digital counters and each group of said at least another group coupled to one transistor of a previous group of at least two transistors to be advanced in digital fashion by each cycle of said previous group as a multiplier thereof,
- means including gate circuits coupled to said plurality of groups of transistors to be advanced step-by-step by said input-advance pulses in unit steps through a cycle for providing individual distinctive outputs for each unit step, a plurality of signal circuits including
- a go signal, a stop signal, and a clearance signal for each of said intersecting lanes,
- means coupled to said gate circuits for energizing the signal circuits in particular steps in response to said output for providing a traffic signal cycle for control of said traffic lanes,
- timing means controlled by said outputs from said first mentioned coupling means in the respective steps for timing therein and for providing said input pulses to advance said multistage counter from step to step,
- and means coupled to said traffic actuated means to be controlled thereby for holding said multistage counting circuit in one particular step of its cycle in absence of actuation of said traffic actuated means and for advancing said counting circuit from said one step in response to such actuation.

23. A traffic actuated signal controller including signal circuits,
a first multistage electronic switching circuit capable of being advanced step-by-step through phases of a traffic signal cycle in response to input pulses,
means for coupling said multistage switching circuit to said signal circuits to control the latter,
a plurality of input circuits adapted to be coupled to traffic detectors,
first timing means coupled to said first multistage switching circuit for providing said input pulses to advance said multistage switching circuit at the end of predetermined periods,
an inhibiting gate coupled to said first timing means and responsive to said input circuits for preventing said timing means from so advancing said multi-stage switching circuit,
a second multistage electronic switching circuit capable of being advanced step-by-step through phases of a subcycle of said traffic signal cycle in response to second input pulses,
means for coupling said second multistage electronic switching circuit to said signal circuits,
second timing means coupled to said second multistage switching circuit for providing said second input pulses to advance said second multistage switching circuit at the end of predetermined periods,
a control gate coupled to said first timing means and to said second multistage switching circuit and to said first multistage switching circuit for preventing advance of said first multistage switching circuit during timing by said second timing means of certain of the steps of said second multistage switching circuit,
means coupling said input circuits to said first timing means at certain steps of said first multistage switching circuit to reset said first timing means for briefly preventing said advance in response to traffic detector actuation,
third timing means coupled to said first multistage switching circuit for providing input pulses for advancing said first multistage switching circuit in the event that said first timing means is prevented from advancing said first multistage switching circuit, and
means coupling said first multistage switching circuit at certain positions to said second multistage switching circuit for resetting said second multistage switching circuit.

References Cited by the Examiner
UNITED STATES PATENTS

| 2,878,423 | 3/1959 | Kips | 340—41 |
| 3,072,883 | 1/1963 | Hendricks | 340—41 |
| 3,090,032 | 5/1963 | Shand | 340—41 |
| 3,175,184 | 3/1965 | Shelar | 340—41 |

FOREIGN PATENTS 1,152,643  8/1963  Germany.

NEIL C. READ, *Primary Examiner.*

THOMAS B. HABECKER, *Examiner.*